(12) United States Patent
Mizoguchi

(10) Patent No.: US 12,174,627 B2
(45) Date of Patent: Dec. 24, 2024

(54) VEHICLE TRAVELING REMOTE CONTROL SYSTEM

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 17/884,988

(22) Filed: Aug. 10, 2022

(65) Prior Publication Data

US 2023/0089023 A1    Mar. 23, 2023

(30) Foreign Application Priority Data

Sep. 23, 2021 (JP) .................................. 2021-154932

(51) Int. Cl.
| | |
|---|---|
| *G05D 1/00* | (2024.01) |
| *B60W 40/02* | (2006.01) |
| *B60W 50/00* | (2006.01) |

(52) U.S. Cl.
CPC .......... *G05D 1/0027* (2013.01); *B60W 40/02* (2013.01); *B60W 50/0097* (2013.01); *G05D 1/0038* (2013.01); *G05D 1/0077* (2013.01); *B60W 2420/403* (2013.01); *B60W 2556/45* (2020.02)

(58) Field of Classification Search
CPC ....... B60W 2420/403; B60W 2556/45; B60W 50/0097; B60W 40/02; G05D 1/0027; G05D 1/0038; G05D 1/0077
See application file for complete search history.

(56) References Cited

U.S. PATENT DOCUMENTS

| | | | |
|---|---|---|---|
| 10,992,755 B1* | 4/2021 | Tran ..................... | G01S 13/88 |
| 2017/0374493 A1* | 12/2017 | Pereira Cabral ........ | H04W 4/70 |
| 2019/0235488 A1* | 8/2019 | Beth ..................... | G05D 1/104 |
| 2020/0039645 A1* | 2/2020 | Soryal ................. | G06Q 10/0631 |
| 2020/0183415 A1* | 6/2020 | Tsimhoni .......... | G08G 1/096811 |
| 2020/0234582 A1* | 7/2020 | Mintz .............. | G08G 1/096811 |

(Continued)

FOREIGN PATENT DOCUMENTS

| | | |
|---|---|---|
| JP | 2018-142921 A | 9/2018 |
| JP | 2018-180771 A | 11/2018 |
| JP | 2020-188407 A | 11/2020 |

*Primary Examiner* — Jaime Figueroa
*Assistant Examiner* — Zachary Joseph Wallace
(74) *Attorney, Agent, or Firm* — Rimon P.C.

(57) ABSTRACT

In a vehicle traveling remote control system, vehicles and a remote control apparatus communicate with each other to repeatedly transmit, from the remote control apparatus to each vehicle, a remote control value to be used to control traveling of each vehicle. The vehicle traveling remote control system includes the remote control apparatus and a traveling control unit. The remote control apparatus includes a remote control value generating unit that repeatedly generates the remote control value for traveling control of each vehicle. The traveling control unit is provided in each vehicle and executes the traveling control based on the remote control value repeatedly received from the remote control apparatus. The remote control apparatus generates, using the remote control value generating unit, the remote control value in accordance with a priority or a target response cycle that are changed depending on a traveling environment of each vehicle.

17 Claims, 16 Drawing Sheets

(56) References Cited

U.S. PATENT DOCUMENTS

2020/0286392 A1* 9/2020 Miller ................... G06T 7/20
2020/0314614 A1* 10/2020 Moustafa ............... H04L 67/34
2021/0399415 A1* 12/2021 Zhang ................. H04W 52/241

* cited by examiner

UNPROCESSED INFORMATION LIST 70

CURRENT TIME 12:10:15:110

| IDENTIFICATION INFORMATION | PRIORITY | RECEPTION TIME | UNPROCESSED VEHICLE INFORMATION |
|---|---|---|---|
| 71 — 001 | LOW | 12:10:15:010 | |
| 72 — 002 | MEDIUM | 12:10:15:012 | SURROUNDING IMAGE, CURRENT POSITION AND TIME, ETC. ⋯ |
| 73 — 003 | HIGH | 12:10:15:015 | SURROUNDING IMAGE, CURRENT POSITION AND TIME, ETC. ⋯ |
| ⋮ | ⋮ | ⋮ | ⋮ |

FIG. 7

| PRIORITY | TARGET RESPONSE CYCLE (WITHIN) |
|---|---|
| 81 — LOW | 500ms |
| 82 — MEDIUM | 300ms |
| 83 — HIGH | 200ms |

[CASE 1: SETTING EXAMPLE IN WHICH STANDARD TRAVELING CONTROL TARGET TIME IS KEPT ON STRAIGHT ROAD]

[CASE 2: SETTING EXAMPLE IN WHICH STANDARD TRAVELING CONTROL TARGET TIME IS KEPT AT ENTRANCE OF CORNER]

[CASE 3: SETTING EXAMPLE IN WHICH TRAVELING CONTROL TARGET TIME IS EXTENDED FROM STANDARD TRAVELING CONTROL TARGET TIME AT ENTRANCE OF CORNER]

VEHICLE TRAVELING REMOTE CONTROL SYSTEM

CROSS-REFERENCE TO RELATED APPLICATIONS

The present application claims priority from Japanese Patent Application No. 2021-154932 filed on Sep. 23, 2021, the entire contents of which are hereby incorporated by reference.

BACKGROUND

The technology relates to a vehicle traveling remote control system.

Traveling of a vehicle, such as an automobile, may be controlled remotely. For example, reference is made to Japanese Unexamined Patent Application Publication Nos. 2018-180771, 2018-142921, and 2020-188407.

SUMMARY

An aspect of the technology provides a vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicle. The vehicle traveling remote control system includes the remote control apparatus and a traveling control unit. The remote control apparatus includes a remote control value generating unit configured to repeatedly generate the remote control value for traveling control of each of the vehicles. The traveling control unit is to be provided in each of the vehicles and configured to execute the traveling control on the basis of the remote control value repeatedly received by the each of the vehicles from the remote control apparatus. The remote control apparatus is configured to generate, using the remote control value generating unit, the remote control value in accordance with a priority or a target response cycle that are changed depending on a traveling environment of each of the vehicles.

An aspect of the technology provides a vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles. The vehicle traveling remote control system includes the remote control apparatus and circuitry. The remote control apparatus is configured to repeatedly generate the remote control value for traveling control of each of the vehicles. The circuitry is to be provided in each of the vehicles and configured to execute the traveling control on the basis of the remote control value repeatedly received by the each of the vehicles from the remote control apparatus. The remote control apparatus is configured to generate the remote control value in accordance with a priority or a target response cycle that are changed depending on a traveling environment of each of the vehicles.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 7 is an explanatory diagram illustrating an unprocessed information list that is recordable in a memory of the server of the remote control apparatus illustrated in FIG. 1 by, for example, the reception control illustrated in FIG. 6.

FIG. 8 is a priority table illustrating a target response cycle for each priority illustrated in FIG. 7.

DETAILED DESCRIPTION

Figure 1:
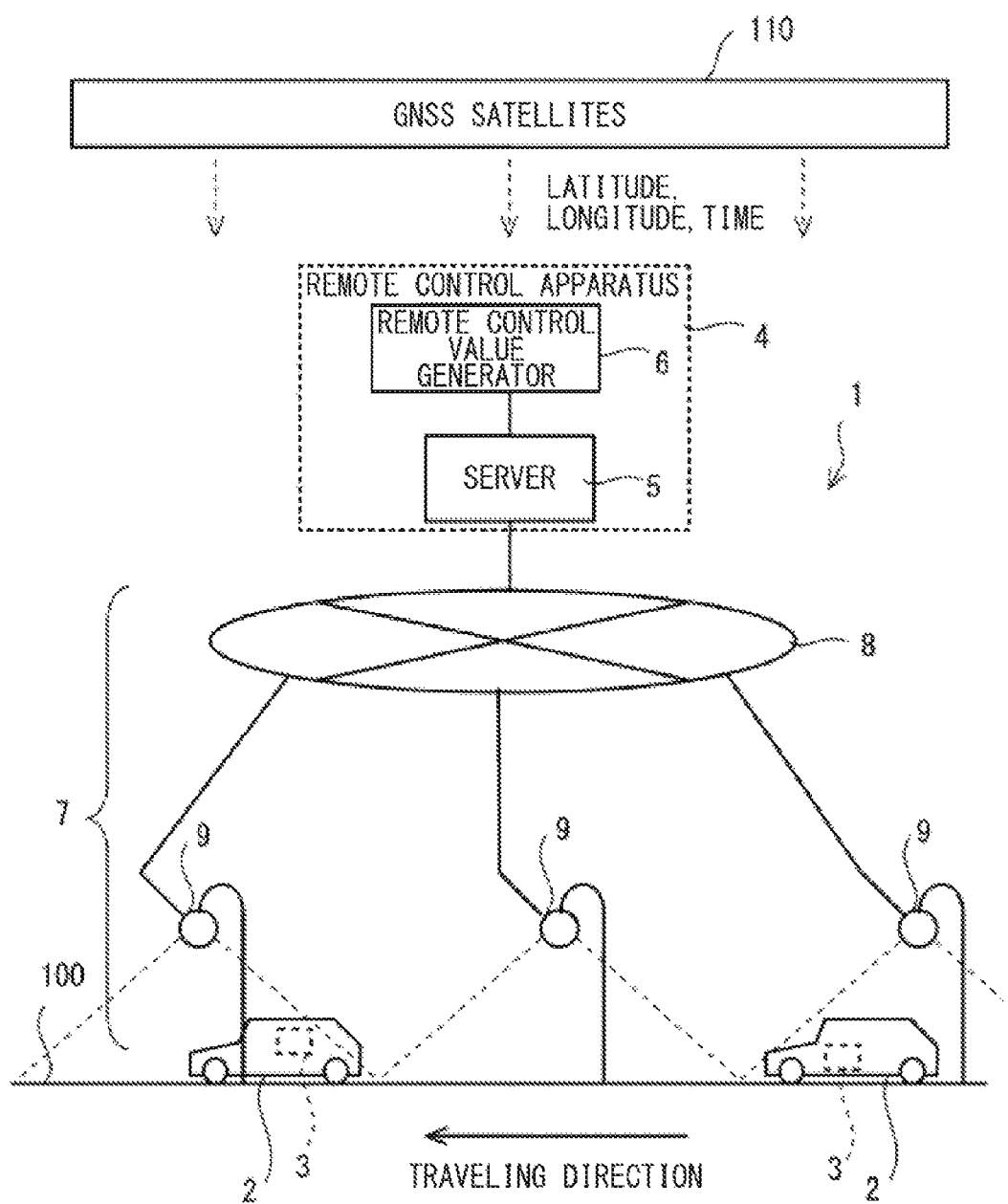
FIG. 1 is a configuration diagram illustrating a remote control system for traveling of a vehicle, according to one example embodiment of the technology.

In a case of remotely controlling traveling of a vehicle, it is desired to enable the vehicle to, for example, repeatedly transmit detection information of an own vehicle sensor to a server serving as a remote control apparatus, and repeatedly receive, from the server, a remote control value to be used to control the traveling of the vehicle. Examples of the detection information include a captured image of a vehicle outside sensor mounted on the own vehicle. Thus, each vehicle that is remotely controlled by the server is able to keep receiving the remote control value from the server, thus being able to control the traveling of the own vehicle.

However, even if each vehicle that is remotely controlled by the server is able to keep receiving the remote control value continuously from the server, the vehicle can become unable to appropriately control the traveling of the own vehicle in a case where the vehicle is unable to receive, at an appropriate timing, the remote control value necessary for traveling control of the own vehicle. For example, in a case where a preceding vehicle decelerates by sudden braking or in a case where the own vehicle enters a curve, a delay in receiving the remote control value can influence the traveling control of the own vehicle.

It is thus desired for a vehicle traveling remote control system to reduce the possibility of becoming unable to control traveling of a vehicle appropriately.

It is desirable to provide a vehicle traveling remote control system that makes it possible to keep controlling traveling of a vehicle appropriately even in a case where a traveling environment changes.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Example Embodiment

FIG. 1 is a configuration diagram illustrating a remote control system 1 for traveling of a vehicle 2, according to a first example embodiment of the technology.

The remote control system 1 illustrated in FIG. 1 may be configured to make it possible to remotely control the traveling of the vehicle 2. The remote control system 1 may include control systems 3 and a remote control apparatus 4. The respective control systems 3 may be provided in a plurality of vehicles 2. The remote control apparatus 4 may include a server 5 and a remote control value generator 6 configured to generate a remote control value. The plurality of vehicles 2 and the server 5 of the remote control apparatus 4 may be coupled to be able to wirelessly communicate with each other by a communication system 7. The communication system 7 may include a plurality of base stations 9 and a communication network 8. The base stations 9 may be arranged along, for example, a road 100 on which the vehicle 2 travels. The plurality of vehicles 2, and the remote control apparatus 4 separate from the plurality of vehicles 2 communicate with each other. This makes it possible to repeatedly transmit, from the remote control apparatus 4 to each of the plurality of vehicles 2, the remote control value to be used to control the traveling of the vehicle 2.

FIG. 1 illustrates global navigation satellite system (GNSS) satellites 110 that output GNSS radio waves receivable by the plurality of vehicles 2 and the server 5. The vehicle 2 or the server 5 is able to obtain its position and time based on a common positioning system by receiving the radio waves from the GNSS satellites 110.

The vehicle 2 may be, for example, an automobile. The vehicle 2 may also be referred to as an own vehicle. Other non-limiting examples of the vehicle 2 may include a motorcycle, a cart, and a personal mobility. Under traveling control of the control system 3 provided in the own vehicle, the vehicle 2 may be caused to travel on, for example, the road 100 by driving force of an engine or a motor serving as a power source, caused to decelerate and stop by actuation of a braking device, and caused to change its traveling direction leftward or rightward by actuation of a steering device. The control system 3 of the vehicle 2 may be basically configured to perform the traveling control based on manual driving on the basis of an operation performed by an occupant of the own vehicle, perform control of assisting traveling based on manual driving on the basis of a detection result obtained by the own vehicle, and perform the traveling control based on automatic driving by using, for example, high-precision map data together with the detection result obtained by the own vehicle.

The plurality of base stations 9 may include, for example, the base station 9 of a carrier communication network for mobile terminals, etc., and the base station 9 for ITS service or ADAS service for the vehicle 2. The base station 9 of the carrier communication network may be, for example, the fifth-generation base station 9. The base station 9 may be fixedly installed on, for example, a road shoulder, a road surface, or a building, or may be mounted on a mobile body, such as the vehicle 2, a vessel, a drone, or an aircraft.

The base station 9 may establish a wireless communication path for transmission and reception of information with an access point (AP) communicator of the control system 3 of the vehicle 2 present within the reach of radio waves. In a case where the vehicle 2 travels on the road 100 to move out of the reach of radio waves, the base station 9 that establishes the wireless communication path may switch between the plurality of base stations 9. Thus, the plurality of base stations 9 arranged along the road 100, for example, enable the vehicle 2 to keep establishing the wireless communication path constantly while traveling.

A wireless communication path that is established with the fifth-generation base station 9 makes it possible to transmit and receive a significantly large amount of information at high speed, as compared with a wireless communication path that is established with the fourth-generation base station 9. The fifth-generation base station 9 may have advanced information processing ability; for example, the base stations 9 may be configured to transmit and receive information to and from each other. Although the vehicles 2 may directly transmit and receive information to and from each other in vehicle-to-vehicle (V2V) communication of the vehicles 2, the vehicles 2 may transmit and receive information to and from each other via the fifth-generation base station 9.

It is expected that using the fifth-generation base station 9 enables the remote control apparatus 4 and each vehicle 2 to communicate with each other at high speed with a delay time of about 100 milliseconds at maximum in one direction, i.e., an upstream direction or a downstream direction. However, in a case where the plurality of vehicles 2 communicate with the remote control apparatus 4, it is difficult to achieve communication at the maximum communication speed equally for the plurality of vehicles 2.

In a case where the vehicle 2 is traveling, the base station 9 with which the vehicle 2 establishes the communication path may switch in response to a change in the position of the vehicle 2. A handover process for switching of the base station 9 can take time.

The communication network 8 may include, for example, the communication network 8 for the carrier communication network, the communication network 8 for the ITS service or the ADAS service, and the Internet, which is an open wide-area communication network. The communication network 8 may include a dedicated communication network 8 newly provided for the remote control system 1. The communication network 8 for the carrier communication network and the Internet may achieve best-effort communication. On the best-effort communication network 8, a communication band available to each device and a transmission delay of communication may dynamically change depending on a communication environment, instead of being fixed. For example, on the communication network 8 for communication based on a TCP/IP protocol, collision due to asynchronous communication can occur, which can cause a transmission delay due to frame retransmission. A transmission delay due to frame retransmission is likely to occur in a case where the handover process takes time.

Figure 2:
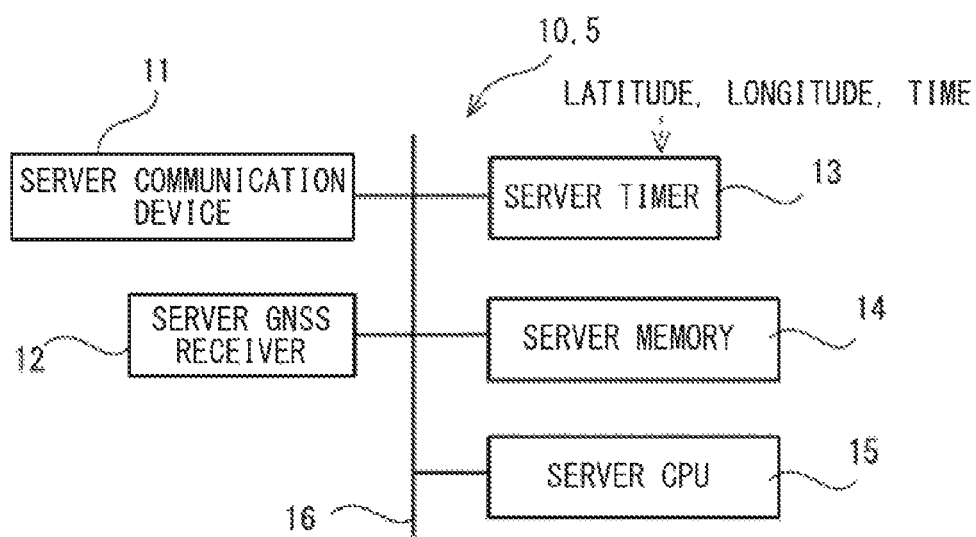
FIG. 2 is a hardware configuration diagram illustrating a computer that may be used for a server of a remote control apparatus illustrated in FIG. 1.

FIG. 2 is a hardware configuration diagram illustrating a computer 10 that may be used for the server 5 of the remote control apparatus 4 illustrated in FIG. 1.

The computer 10 illustrated in FIG. 2 may include a server communication device 11, a server GNSS receiver 12, a server timer 13, a server memory 14, a server CPU 15, and a server bus 16. The server communication device 11, the server GNSS receiver 12, the server timer 13, the server memory 14, and the server CPU 15 may be coupled to the server bus 16.

The server communication device 11 may be coupled to the communication network 8. The server communication device 11 may transmit and receive information to and from another device coupled to the communication network 8, for example, the base station 9 or the control system 3 of the vehicle 2.

The server GNSS receiver 12 may receive the radio waves from the GNSS satellites 110 to obtain a current time.

The server timer 13 may measure a time and a time period. The time of the server timer 13 may be calibrated by the current time of the server GNSS receiver 12.

The server memory 14 may hold a program to be executed by the server CPU 15, and data.

The server CPU 15 may read the program from the server memory 14 and execute the program. This enables a server control unit to be implemented in the server 5.

The server CPU 15 serving as the server control unit may manage overall operation of the server 5 and overall control of the remote control system 1. The server CPU 15 may manage, for example, the plurality of vehicles 2 that use the remote control system 1, and traveling of the plurality of vehicles 2.

For example, the server CPU 15 may manage information received from each of the plurality of vehicles 2, control generation of the remote control value for the vehicle 2 from which the information has been received, and control transmission of the remote control value generated for the vehicle 2 from which the information has been received. In this case, the server memory 14 may hold the information received from the plurality of vehicles 2 and the high-precision map data, for example, to be used to generate the remote control value. The server CPU 15 may repeat the generation and transmission of the remote control value for each vehicle 2, by repeatedly receiving the latest information from each vehicle 2. This enables each vehicle 2 to continue the traveling based on the remote control value repeatedly generated by the remote control apparatus 4.

The remote control value generator 6 may be basically configured to be able to operate similarly to a traveling control ECU 24 of the control system 3 of the vehicle 2 to be described later. The computer 10 illustrated in FIG. 2 may be used as hardware for the remote control value generator 6. In one embodiment, the remote control value generator 6 may serve as a "remote control value generating unit".

Although the example embodiment describes that the remote control value generator 6 configured to generate the remote control value for each vehicle is separate from the server 5 that manages communication of the remote control apparatus 4, the remote control value generator 6 and the server 5 may be implemented by one computer 10.

The remote control value generator 6 may repeatedly generate, for each vehicle 2, the remote control value available for traveling control of each of the plurality of vehicles 2.

Accordingly, the server 5 that manages the communication of the remote control apparatus 4 may be coupled to a plurality of remote control value generators 6 in a one-to-many relationship. The remote control value generator 6 may be basically provided, in one-to-one correspondence, for each of the plurality of vehicles 2 that are managed by the remote control apparatus 4. However, one remote control value generator 6 may generate the remote control value for the plurality of vehicles 2. For example, the plurality of remote control value generators 6 may be provided for each type of the vehicle 2, because the remote control value generator 6 is configured to generate the remote control value for the traveling control of the vehicle. Different types of vehicles 2 are basically assumed to differ in traveling characteristics and traveling control characteristics.

Figure 3:
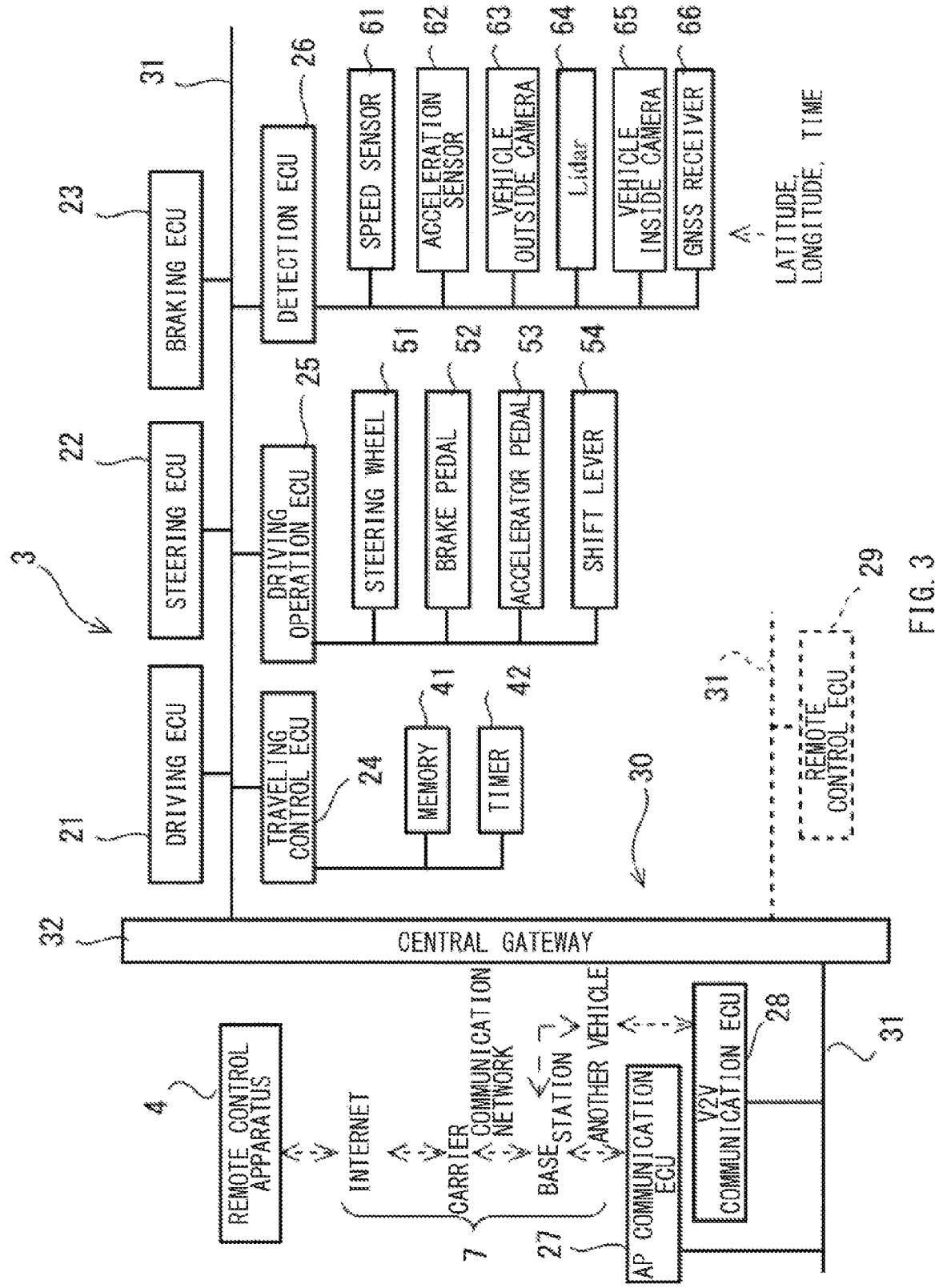
FIG. 3 is a configuration diagram illustrating a control system that controls the traveling of the vehicle illustrated in FIG. 1.

FIG. 3 is a configuration diagram illustrating the control system 3 that controls the traveling of the vehicle 2 illustrated in FIG. 1.

FIG. 3 illustrates, as representatives, respective control electronic control units (ECUs) incorporated in a plurality of control devices included in the control system 3 provided in the vehicle 2. As with the server 5 illustrated in FIG. 2, each of the control devices may include, in addition to the control ECU, for example, an unillustrated memory, an unillustrated input and output port, an unillustrated timer, and an unillustrated internal bus. The memory may hold a control program and data. The timer may measure a time period and a time. The memory, the input and output port, and the timer may be coupled to the internal bus.

FIG. 3 illustrates, as the plurality of control ECUs included in the control system 3 of the vehicle 2, for example, a driving ECU 21 for a driving device, a steering ECU 22 for the steering device, a braking ECU 23 for the braking device, the traveling control ECU 24, a driving operation ECU 25, a detection ECU 26, an AP communication ECU 27, and a V2V communication ECU 28. The control system 3 of the vehicle 2 may include another unillustrated control ECU.

The plurality of control ECUs may be coupled to a vehicle network 30 such as a controller area network (CAN) or a local interconnect network (LIN) used in the vehicle 2. The vehicle network 30 may include a plurality of bus cables 31 and a central gateway (CGW) 32. The plurality of bus cables 31 may allow the plurality of control ECUs to be coupled to each other. The central gateway (CGW) 32 may serve as a relay to which the plurality of bus cables 31 are coupled. Identifications (IDs) different from each other may be assigned to the plurality of control ECUs. The IDs may each serve as identification information. The control ECUs may each basically output data to other control ECUs periodically. The data may have an ID for one of the control ECUs and another ID for another one of the control ECUs. The one of the control ECUs may represent a source of output. The other one of the control ECUs may represent a destination of output. Each of the other control ECUs may monitor the bus cables 31. In a case where an ID that represents a destination of output corresponds to the ID of one of the control ECUs, for example, the one of the control ECUs may acquire data, and execute processing on the basis of the data. The central gateway 32 may monitor each of the plurality of bus cables 31 coupled thereto. In a case where one of the control ECUs representing a source of output is coupled to one of the bus cables 31, another one of the control ECUs is coupled to another one of the bus cables 31, and the central gateway 32 detects that an ID representing a destination of output corresponds to the other one of the control ECUs, the central gateway 32 may output data to the other one of the bus cables 31. Through the relaying performed by the central gateway 32, while one of the plurality of control ECUs is coupled to one of the bus cables 31, and another one of the control ECUs is coupled to another one of the bus cables 31, exchanging of data to be inputted and outputted may be achieved between the one of the plurality of control ECUs and the other one of the plurality of control ECUs.

The driving operation ECU 25 may be coupled to operation members. The operation members may be used by the occupant to control the traveling of the vehicle 2. Non-limiting examples of the operation members may include a steering wheel 51, a brake pedal 52, an accelerator pedal 53, and a shift lever 54. As one of the operation members is operated, the driving operation ECU 25 may output data to the vehicle network 30. The data may include whether there is an operation and an amount of the operation. The driving operation ECU 25 may execute processing regarding the operation that is made on the one of the operation members. The driving operation ECU 25 may include a result of the processing in the data.

The detection ECU 26 may be coupled to own vehicle sensors configured to detect a traveling environment of the vehicle 2. Non-limiting examples of the own vehicle sensors may include a speed sensor 61, an acceleration sensor 62, a vehicle outside camera 63, a LIDAR 64, a vehicle inside camera 65, and a GNSS receiver 66. The speed sensor 61 may detect a speed of the vehicle 2. The acceleration sensor 62 may detect an acceleration rate of the vehicle 2. The vehicle outside camera 63 may capture an image of the outside of the vehicle 2. The LIDAR 64 may detect an object present outside the vehicle 2 by laser irradiation. The vehicle inside camera 65 may capture an image of the inside of the vehicle 2. The GNSS receiver 66 may detect the position of the vehicle 2. The vehicle outside camera 63 may be, for example, a stereo camera, a monocular camera, or a 360-degree camera. In one embodiment, the own vehicle sensor may serve as a "vehicle sensor". In one embodiment, the vehicle outside camera 63 may serve as a "vehicle outside sensor". The GNSS receiver 66 may receive the radio waves from the GNSS satellites 110, as with the server GNSS receiver 12, to obtain a latitude, a longitude, and an altitude, indicating the current position of the own vehicle, and a current time. It is thus expected that the current time of the vehicle 2 match, with high precision, the current time based on the server GNSS receiver 12 of the server 5. The detection ECU 26 may output, to the vehicle network 30, for example, detection information acquired from the own vehicle sensor and a processing result based on the detection information. For example, the detection ECU 26 may execute a process of recognizing a pedestrian, a traffic light, another vehicle, and a road shape outside the vehicle, included in the captured image of the vehicle outside camera 63, and output a result of the recognition to the vehicle network 30.

Note that the detection ECU 26 may be coupled to an occupant sensor other than the vehicle inside camera 65, such as a vehicle inside millimeter-wave sensor, a seating sensor, or a sensor for the steering wheel 51.

The AP communication ECU 27 may be an AP communication device serving as the AP communicator. The AP communication ECU 27 may establish a wireless communication path between the vehicle 2 and the base station 9. In remote control, the AP communication ECU 27 may repeat transmission and reception of data to and from the server 5 of the remote control apparatus 4 by using the wireless communication path established with the base station 9.

The V2V communication ECU 28 may be a V2V communication device serving as a V2V communicator. The V2V communication ECU 28 may execute V2V communication between the vehicle 2 and another vehicle. The V2V communication ECU 28 may communicate with the other vehicle that has established a wireless communication path with the base station 9. This enables the V2V communication ECU 28 to, for remote control, repeat transmission and reception of data to and from the server 5 of the remote control apparatus 4 via the other vehicle.

The traveling control ECU 24 may be coupled to a memory 41 and a timer 42. The memory 41 may be a computer-readable recording medium. The memory 41 may hold, for example, a program to be executed by the traveling control ECU 24, and data. The memory 41 may hold, for example, data for driving assistance, such as lane keep control or inter-vehicle distance control, and the high-precision map data for automatic driving. The traveling control ECU 24 may read the program from the memory 41, and execute the program. This enables the traveling control ECU 24 to serve as a control unit configured to control the traveling of the vehicle 2.

The traveling control ECU 24 serving as the control unit that controls the traveling of the vehicle 2 may acquire information from each unit of the control system 3 of the vehicle 2 to control the traveling of the own vehicle.

Upon acquiring information on a manual operation of the occupant from, for example, the driving operation ECU 25, the traveling control ECU 24 may generate an own vehicle control value based on the manual operation of the occupant as it is, or generate the own vehicle control value finely adjusted to assist the manual operation of the occupant. In one embodiment, the own vehicle control value may serve as a "vehicle control value".

In automatic driving, for example, the traveling control ECU 24 may acquire information from the detection ECU 26, determine the own vehicle position on the high-precision map data and the possibility of coming into contact with another vehicle, and generate the own vehicle control value for the automatic driving. The automatic driving may be achieved by, for example, the own vehicle control value for steering and the own vehicle control value for acceleration or deceleration. The own vehicle control value for steering may be used for the lane keep control to keep a lateral position of the vehicle 2 near the middle of a lane. The own vehicle control value for acceleration or deceleration may be used to control a longitudinal position of the vehicle 2 to keep an inter-vehicle distance.

The traveling control ECU 24 may output these generated own vehicle control values to the driving ECU 21, the steering ECU 22, and the braking ECU 23 via the vehicle network 30.

This enables the traveling control ECU 24 to generate the own vehicle control value to be used for the traveling control of the vehicle 2 on the basis of the operation performed by the occupant of the own vehicle or the automatic driving. The traveling control ECU 24 may serve as an own vehicle control value generating unit. In one embodiment, the traveling control ECU 24 may serve as a "vehicle control value generating unit".

In remotely controlling the traveling of the own vehicle, the traveling control ECU 24 serving as the control unit that controls the traveling of the vehicle 2 may communicate with the server 5 of the remote control apparatus 4 by using the AP communication ECU 27 or the V2V communication ECU 28, and acquire the remote control value from the server 5.

The remote control value generator 6 of the remote control apparatus 4 may generate the remote control values equivalent to the above-described own vehicle control values to be generated by the traveling control ECU 24, by a process similar to a generation process to be performed for the automatic driving by the traveling control ECU 24.

The traveling control ECU 24 may output these acquired remote control values to the driving ECU 21, the steering ECU 22, and the braking ECU 23 via the vehicle network 30.

This enables the traveling control ECU 24 to execute the traveling control based on the remote control value repeatedly received from the remote control apparatus 4. In one embodiment, the traveling control ECU 24 may serve as a "traveling control unit".

The driving ECU 21 may receive a control value generated or acquired by the traveling control ECU 24. The driving ECU 21 may thereby control the acceleration of the vehicle 2 on the basis of the control value by controlling operation of a driving force source, such as the engine or the motor, of the vehicle 2. In one embodiment, the driving ECU 21 may serve as a "traveling processor".

The steering ECU 22 may receive a control value generated or acquired by the traveling control ECU 24. The steering ECU 22 may thereby control the traveling direction of the vehicle 2 on the basis of the control value by controlling operation of a steering force generator, such as a motor for the steering wheel 51, of the vehicle 2. In one embodiment, the steering ECU 22 may serve as the "traveling processor".

The braking ECU 23 may receive a control value generated or acquired by the traveling control ECU 24. The braking ECU 23 may thereby control the deceleration of the vehicle 2 on the basis of the control value by controlling operation of a braking force generator, such as a brake pump, of the vehicle 2. In one embodiment, the braking ECU 23 may serve as the "traveling processor".

Figure 4:
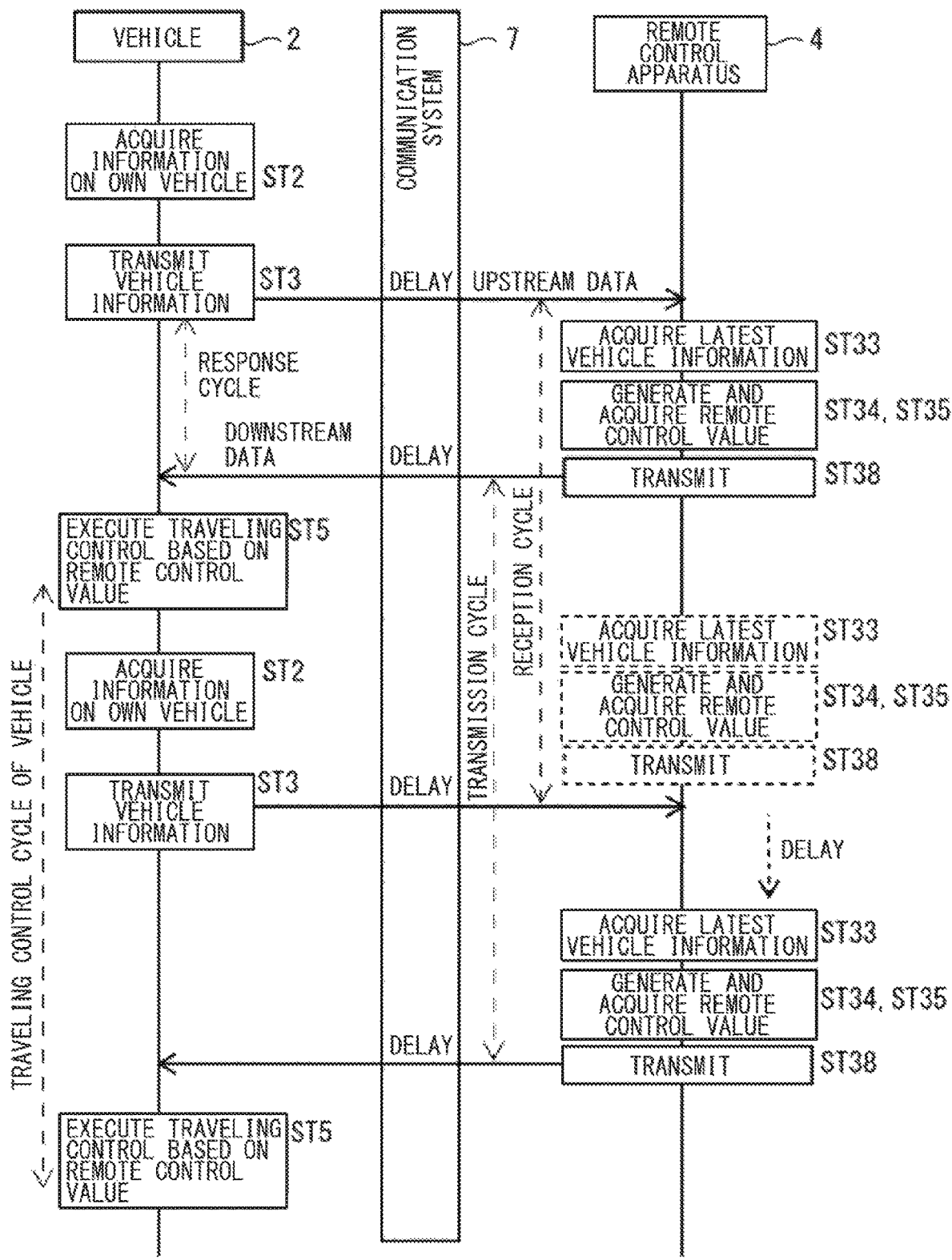
FIG. 4 is a timing chart illustrating a basic flow of remote control in the remote control system illustrated in FIG. 1.

FIG. 4 is a timing chart illustrating a basic flow of the remote control in the remote control system 1 illustrated in FIG. 1.

FIG. 4 illustrates an example in which one vehicle 2 repeatedly communicates with the remote control apparatus 4 via the communication system 7 including, for example, the communication network 8. In FIG. 4, time may flow from the top to the bottom.

In FIG. 4, the vehicle 2 may first acquire information on the own vehicle in step ST2, and transmit vehicle information to the remote control apparatus 4 via the communication system 7 in step ST3. The vehicle 2 may transmit, to the remote control apparatus 4, at least the detection information of the own vehicle sensor and the position and the time of the own vehicle. The detection information of the own vehicle sensor may include the captured image of the vehicle outside sensor mounted on the own vehicle.

The remote control apparatus 4 may receive such upstream data from the vehicle 2. Thereafter, the remote control apparatus 4 may acquire the latest vehicle information regarding the vehicle 2 in step ST33, generate and acquire the remote control value by using the vehicle information received from each vehicle 2 in step ST34 and step ST35, and transmit the acquired remote control value to the vehicle 2 via the communication system 7 in step ST38.

The vehicle 2 may receive such downstream data from the remote control apparatus 4. Thereafter, the vehicle 2 may execute the traveling control based on the remote control value in step ST5. The vehicle 2 may acquire, from the remote control apparatus 4, the remote control value receivable by the traveling processor as with the own vehicle control value generated by the own vehicle, and execute the traveling control.

The vehicle 2 and the remote control apparatus 4 may repeat the series of processes described above. This enables the vehicle 2 to receive a plurality of remote control values repeatedly transmitted from the remote control apparatus 4, and continuously execute the traveling control based on the remote control value. The vehicle 2 is able to travel on the basis of the remote control, by executing the traveling control of the vehicle 2 in a traveling control cycle corresponding to a reception cycle of the plurality of remote control values transmitted from the remote control apparatus 4.

In such remote control, it is important that the plurality of remote control values be transmitted from the remote control apparatus 4 in a short transmission cycle, in terms of safety and reliability of the traveling of the vehicle 2 that is controlled remotely. In the traveling control of the vehicle 2, it may be desired to execute the control in a cycle of every 100 milliseconds, or at least a traveling control cycle of about 200 milliseconds. Otherwise, in some traveling environments, it can be predicted that, for example, sufficiently reliable lane keep control or inter-vehicle distance control is not achieved. In other words, even if each vehicle 2 that is controlled remotely is able to keep receiving the remote control value continuously, the vehicle 2 can become unable to appropriately control the traveling of the own vehicle in a case where the vehicle 2 is unable to receive, at an appropriate timing, the remote control value necessary for the traveling control of the own vehicle. For example, in a case where a preceding vehicle 101 decelerates by sudden braking or in a case where the own vehicle enters a curve, a delay in receiving the remote control value can influence the traveling control of the own vehicle. Also in the case of FIG. 4, it may be desired to achieve a traveling control cycle of 100 milliseconds.

On the other hand, it is not easy for the remote control apparatus 4 to always achieve a transmission cycle or reception cycle of 100 milliseconds for each vehicle 2 in terms of, for example, processing load. In a case of using the communication network 8 of the carrier communication network for mobile terminals, etc. for a part of the communication network 8, for example, it is assumed to be difficult to achieve such a cycle even by using the fifth-generation communication network 8, because of occurrence of communication for other purposes.

It may thus be desired for the remote control system 1 for the traveling of the vehicle 2 to reduce the possibility of becoming unable to remotely control the traveling of the vehicle 2 appropriately.

The vehicle 2 may be in a reception wait state for the downstream data from the remote control apparatus 4, in a response cycle of the remote control apparatus 4. The response cycle may be from the transmission of the vehicle information as the upstream data to the remote control apparatus 4 in step ST3 until the reception of the downstream data from the remote control apparatus 4. If it is possible to shorten the response cycle depending on the traveling environment, it is possible to shorten the traveling control cycle as well.

Figure 5:
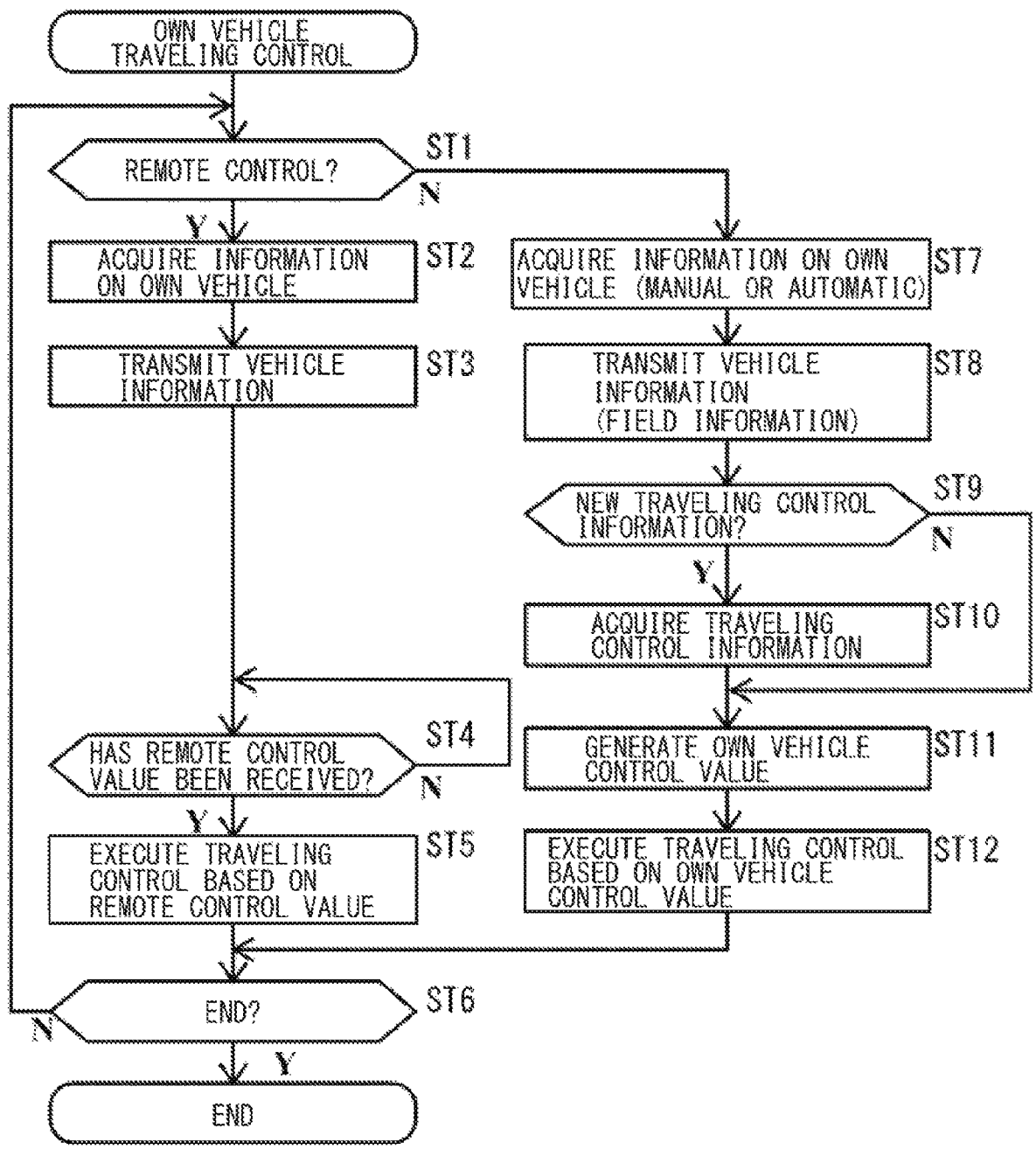
FIG. 5 is a flowchart illustrating own vehicle traveling control to be performed by the control system of the vehicle illustrated in FIG. 1.

FIG. 5 is a flowchart illustrating own vehicle traveling control to be performed by the control system 3 of the vehicle 2 illustrated in FIG. 1.

The own vehicle traveling control illustrated in FIG. 5 may control the traveling of the own vehicle by switching between remote control processes of steps ST2 to ST5 and own vehicle control processes of steps ST7 to ST12.

The traveling control ECU 24, for example, of the control system 3 of the vehicle 2 may repeatedly execute the own vehicle traveling control illustrated in FIG. 5 to control the traveling of the own vehicle.

Note that a control ECU other than the traveling control ECU 24 of the control system 3 of the vehicle 2, such as a remote control ECU 29 indicated by a dashed line in FIG. 3, may repeatedly execute some processes of the own vehicle traveling control illustrated in FIG. 5, for example, processes of step ST2 to ST6 of FIG. 5. The same applies to control illustrated in each of the following flowcharts.

In step ST1, the traveling control ECU 24 of the control system 3 of the vehicle 2 may determine whether to select the remote control as the traveling control of the own vehicle. The traveling control ECU 24 may determine whether to select the remote control on the basis of, for example, an operation performed by the occupant of the own vehicle. If the traveling control ECU 24 selects the remote control (ST1: Y), the traveling control ECU 24 may cause the flow to proceed to step ST2. If the traveling control ECU 24 does not select the remote control (ST1: N), the traveling control ECU 24 may cause the flow to proceed to step ST7.

From step ST2, the traveling control ECU 24 may start the remote control. The traveling control ECU 24 may acquire the vehicle information of the own vehicle detected by the own vehicle. The vehicle information may include at least the detection information of the own vehicle sensor, the position and the time of the own vehicle obtained by the GNSS receiver 66, the speed, the acceleration rate, and a steering angle, for example. The detection information of the own vehicle sensor may include the captured image of the vehicle outside sensor mounted on the own vehicle.

In step ST3, the traveling control ECU 24 may transmit the vehicle information of the own vehicle acquired in step ST2 to the remote control apparatus 4. The traveling control ECU 24 may transmit the vehicle information of the own vehicle to the remote control apparatus 4 by using the communication path established by the AP communication ECU 27 or the communication path established by the V2V communication ECU 28. The vehicle information of the own vehicle transmitted from the vehicle 2 may be received by the server communication device 11 of the server 5 of the remote control apparatus 4 via, for example, the base station 9, the carrier communication network, and the Internet. The remote control apparatus 4 may use the vehicle information received from each vehicle 2 to generate a remote control value for the vehicle 2, and transmit the remote control value to the vehicle 2 that has transmitted the vehicle information.

In step ST4, the traveling control ECU 24 may wait for reception of a remote control value from the remote control apparatus 4. The traveling control ECU 24 may repeat this process until a remote control value is received from the remote control apparatus 4. If the AP communication ECU 27 or the V2V communication ECU 28 receives a remote control value transmitted as the downstream data from the remote control apparatus 4 to the own vehicle (ST4: Y), the traveling control ECU 24 may cause the flow to proceed to step ST5.

In step ST5, the traveling control ECU 24 may execute the traveling control based on the remote control value acquired from the remote control apparatus 4 by the reception. The traveling control ECU 24 may output the remote control value to the driving ECU 21, the steering ECU 22, and the braking ECU 23. The driving ECU 21, the steering ECU 22, and the braking ECU 23 may each execute the traveling control on the basis of the received remote control value. This enables the traveling of the vehicle 2 to be controlled by the remote control value generated by the remote control apparatus 4.

In step ST6, the traveling control ECU 24 may determine whether to end the traveling control. For example, in a case where the occupant operates an unillustrated ignition switch, the traveling control ECU 24 may determine to end the traveling control, and end this control. If the traveling control ECU 24 does not end the traveling control (ST6: N), the traveling control ECU 24 may cause the flow to return to step ST1. The traveling control ECU 24 may repeatedly execute, for example, the remote traveling control described above until the traveling control ECU 24 determines to end the traveling control in step ST6. This enables the traveling of the vehicle 2 to keep being controlled by the plurality of remote control values repeatedly generated by the remote control apparatus 4.

Step ST7 may be the own vehicle control process that is started in a case where the traveling control ECU 24 determines not to select the remote control in step ST1. The traveling control ECU 24 may acquire the vehicle information of the own vehicle detected by the own vehicle. The vehicle information of the own vehicle that is acquired in step ST7 may be the same as the vehicle information of the own vehicle that is acquired in step ST2.

In step ST8, the traveling control ECU 24 may transmit the vehicle information of the own vehicle acquired in step ST7 to the remote control apparatus 4. The traveling control ECU 24 may transmit the vehicle information of the own vehicle to the remote control apparatus 4 by using the communication path established by the AP communication ECU 27 or the communication path established by the V2V communication ECU 28. The vehicle information of the own vehicle transmitted from the vehicle 2 may be received by the server communication device 11 of the server 5 of the remote control apparatus 4 via, for example, the base station 9, the carrier communication network, and the Internet. The remote control apparatus 4 may perform mapping of the positions of the plurality of vehicles 2 in a virtual space based on the high-precision map data, and generate, for example, a range in which each vehicle 2 is able to travel and a direction in which each vehicle 2 is able to travel, on the basis of the mapping. The remote control apparatus 4 may transmit, to the vehicle 2 that has transmitted the vehicle information, traveling control information including the generated range and direction in which the vehicle 2 is able to travel. The remote control apparatus 4 may additionally generate, for example, speed limit information and a lane or course along which the vehicle 2 is able to travel, and transmit such generated information to the vehicle 2 that has transmitted the vehicle information.

In step ST9, the traveling control ECU 24 may determine whether the AP communication ECU 27 or the V2V communication ECU 28 has received new traveling control information from the remote control apparatus 4. If new traveling control information has been received (ST9: Y), the traveling control ECU 24 may cause the flow to proceed to step ST10. If new traveling control information has not been received (ST9: N), the traveling control ECU 24 may cause the flow to proceed to step ST11.

In step ST10, the traveling control ECU 24 may acquire the new traveling control information.

In step ST11, the traveling control ECU 24 may autonomously generate an own vehicle control value in the own vehicle, on the basis of the vehicle information acquired from each unit of the own vehicle in step ST7. In a case where the new traveling control information has been acquired in step ST10, the traveling control ECU 24 may generate the own vehicle control value for traveling within the range of the traveling control information.

In step ST12, the traveling control ECU 24 may execute the traveling control based on the own vehicle control value generated by the own vehicle. The traveling control ECU 24 may output the own vehicle control value to the driving ECU 21, the steering ECU 22, and the braking ECU 23. The driving ECU 21, the steering ECU 22, and the braking ECU 23 may each execute the traveling control on the basis of the received own vehicle control value. This enables the traveling of the vehicle 2 to be autonomously controlled by the own vehicle. Thereafter, the traveling control ECU 24 may cause the flow to proceed to step ST6. The traveling control ECU 24 may repeatedly execute, for example, the autonomous traveling control of the own vehicle described above until the traveling control ECU 24 determines to end the traveling control in step ST6. This enables the traveling of the vehicle 2 to keep being controlled by the plurality of own vehicle control values repeatedly generated on an autonomous basis by the own vehicle.

Figure 6:
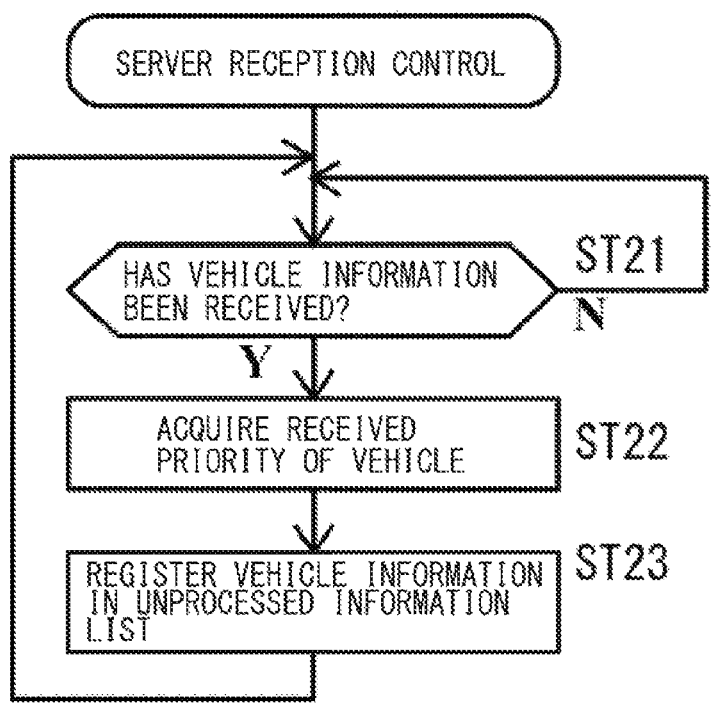
FIG. 6 is a flowchart illustrating reception control to be performed by the server of the remote control apparatus illustrated in FIG. 1.

FIG. 6 is a flowchart illustrating reception control to be performed by the server 5 of the remote control apparatus 4 illustrated in FIG. 1.

The server CPU 15 of the server 5 of the remote control apparatus 4 may repeatedly execute the reception control illustrated in FIG. 6.

In step ST21, the server CPU 15 of the server 5 of the remote control apparatus 4 may determine whether new vehicle information has been received from the vehicle 2. If new vehicle information has not been received from the vehicle 2 (ST21: N), the server CPU 15 may repeat this process. If the server communication device 11 receives new vehicle information (ST21: Y), the server CPU 15 may cause the flow to proceed to step ST22.

In step ST22, the server CPU 15 may acquire a received priority of the vehicle 2. In a case where the newly received vehicle information does not include a priority request, for example, the server CPU 15 may acquire a low priority.

In step ST23, the server CPU 15 may register the received vehicle information of the vehicle 2 in an unprocessed information list 70 of the server memory 14.

Thereafter, the server CPU 15 may cause the flow to return to step ST21, and repeat the processes from step ST21 to step ST23. Thus, in a case where new vehicle information is received from one vehicle 2 or vehicle information is received from another vehicle different from the one vehicle 2, the server 5 is able to temporarily hold such new vehicle information, by adding the vehicle information to the unprocessed information list 70 of the server memory 14 or updating the unprocessed information list 70 with the vehicle information.

FIG. 7 is an explanatory diagram illustrating the unprocessed information list 70 recordable in the server memory 14 of the server 5 of the remote control apparatus 4 illustrated in FIG. 1 by, for example, the reception control illustrated in FIG. 6.

The unprocessed information list 70 of FIG. 7 may include a plurality of records for the respective vehicles 2 from which the remote control apparatus 4 has ever received the vehicle information.

A first record 71 from the top in FIG. 7 may be a record regarding the vehicle 2 assigned with identification information 001, and may hold the priority of the vehicle 2 and a reception time of the latest vehicle information of the vehicle 2. No data may be held as unprocessed vehicle information, because the vehicle information has been processed. The priority may be low.

A second record 72 from the top may be a record regarding the vehicle 2 assigned with identification information 002, and may hold the priority of the vehicle 2, the reception time of the latest vehicle information of the vehicle 2, and the unprocessed vehicle information. The priority may be medium.

A third record 73 from the top may be a record regarding the vehicle 2 assigned with identification information 003, and may hold the priority of the vehicle 2, the reception time of the latest vehicle information of the vehicle 2, and the unprocessed vehicle information. The priority may be high.

The unprocessed information list 70 in the state of FIG. 7 may hold the vehicle information of the plurality of vehicles 2 in an order in which the vehicle information has been received.

FIG. 8 is a priority table 80 illustrating a target response cycle for each priority illustrated in FIG. 7.

The target response cycle may refer to a cycle that is allowable as the response cycle illustrated in FIG. 4. However, even if the actual response cycle exceeds the target response cycle, the traveling control of each vehicle 2 is not necessarily affected. The target response cycle may indicate a desired target.

The priority table 80 of FIG. 8 illustrates low, medium, and high as examples of the priority acquirable regarding each vehicle 2.

In a record 81 of the priority table 80 of FIG. 8, a target response cycle of 500 milliseconds may be associated with the low priority. In a case where the vehicle 2 is traveling in a traveling environment where the remote control value is unlikely to change greatly, it is expected that the vehicle 2 is likely to be able to keep traveling while keeping the lane even if the remote control value is updated in a relatively long target response cycle of 500 milliseconds. Non-limiting examples of the case where the vehicle 2 is traveling in a traveling environment where the remote control value is unlikely to change greatly may include a case where the vehicle 2 is traveling on a straight expressway at a slow speed while keeping a sufficient longitudinal inter-vehicle distance.

In a record 82, a target response cycle of 300 milliseconds may be associated with the medium priority.

In a record 83, a target response cycle of 100 milliseconds may be associated with the high priority. In entering a curve or upon sudden braking of the preceding vehicle 101, for example, the traveling of the vehicle 2 may have to be controlled to be changed greatly in a short cycle. The remote control may be executed on the basis of the remote control value updated every 100 milliseconds. It is expected that this makes the vehicle 2 likely to be able to keep traveling while favorably keeping the lane, even in such a traveling environment where the remote control value tends to change greatly.

The response cycle may be total time of upstream and downstream communication. Time to be taken for only upstream communication or time to be taken for only downstream communication may be associated with each priority.

Thus, in a case where new vehicle information is received from the vehicle 2 with a low priority, for example, the server CPU 15 is able to adjust and manage a timing of generating the remote control value based on the vehicle information of the vehicle 2, to allow the remote control value to be transmitted, within 500 milliseconds from the reception time, to the vehicle 2 that has transmitted the vehicle information. The server CPU 15 is able to execute the process of generating the remote control values based on a plurality of pieces of vehicle information in an order different from the order in which the vehicle information has been received.

In the unprocessed information list 70, a time when each vehicle 2 transmits the upstream data may be received and recorded, instead of the time when the server 5 receives the upstream data, which enables control in a more accurate response cycle.

The upstream data may include, for example, the captured image of the vehicle outside camera 63, unlike the downstream data. Transmission of image data may take time.

Figure 9:
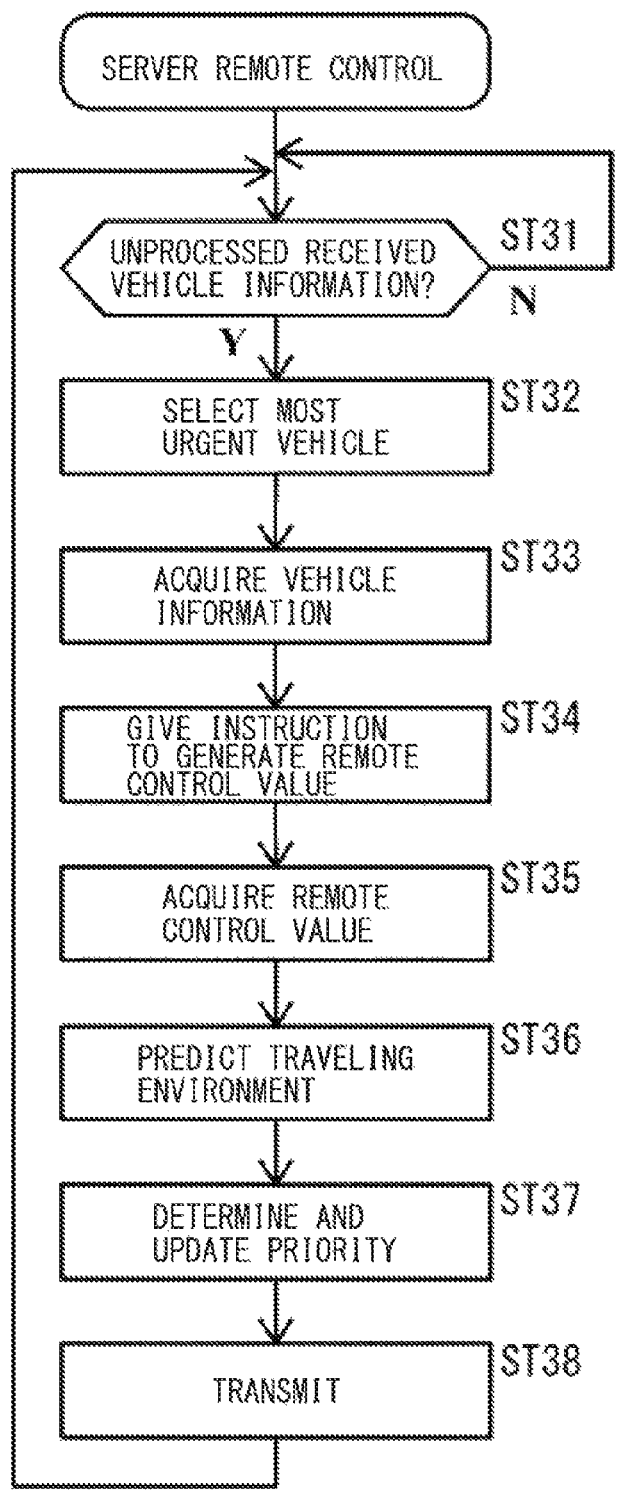
FIG. 9 is a flowchart illustrating remote control to be performed by the server of the remote control apparatus illustrated in FIG. 1.

FIG. 9 is a flowchart illustrating remote control to be performed by the server 5 of the remote control apparatus 4 illustrated in FIG. 1.

The server CPU 15 of the server 5 of the remote control apparatus 4 may repeat the remote control illustrated in FIG. 9.

In step ST31, the server CPU 15 of the server 5 of the remote control apparatus 4 may determine whether the unprocessed information list 70 held in the server memory 14 includes unprocessed received vehicle information. If unprocessed vehicle information is not included (ST31: N), the server CPU 15 may repeat this process. If unprocessed vehicle information is included (ST31: Y), the server CPU 15 may cause the flow to proceed to step ST32 to process the unprocessed vehicle information.

In step ST32, the server CPU 15 may select the most urgent vehicle information of the vehicle 2 closest to expiration in the unprocessed information list 70.

In step ST33, the server CPU 15 may acquire the vehicle information of the vehicle 2 selected in step ST32.

In step ST34, the server CPU 15 may give the vehicle information to the remote control value generator 6 coupled to the server 5 of the remote control apparatus 4, and instruct the remote control value generator 6 to generate a remote control value. The remote control value generator 6 may generate the remote control value by using the given vehicle information. The remote control value generator 6 may generate the remote control value for each vehicle 2, on the basis of the captured image of the vehicle outside camera 63, for example, included in the vehicle information of each vehicle 2. The remote control value generator 6 may generate the remote control value available as it is for the lane keep control or the inter-vehicle distance control, for example, as the remote control value available to the vehicle 2 that has transmitted the vehicle information, by a process similar to the process to be performed by the traveling control ECU 24 of the vehicle 2. The remote control value generator 6 may output the generated remote control value to the server 5.

In step ST35, the server CPU 15 may acquire, from the remote control value generator 6, the remote control value generated by the remote control value generator 6.

In step ST36, the server CPU 15 may determine the traveling environment on the basis of the captured image of the vehicle outside camera 63, for example, included in the vehicle information of the vehicle 2, for determination of the priority to be transmitted to the vehicle 2 together with the remote control value. The server CPU 15 may indirectly determine the traveling environment on the basis of, for example, a difference in magnitude, from the previous remote control value, of the latest remote control value generated by the remote control apparatus 4. The difference may also be referred to as an amount of change.

In step ST37, the server CPU 15 may determine the priority of each vehicle 2 corresponding to the traveling environment, on the basis of the traveling environment of each vehicle 2 determined in step ST36. The server CPU 15 may update the priority held for the relevant vehicle 2 in the server memory 14. By the priority being updated to a different priority in the server memory 14, the priority and the target response cycle for the relevant vehicle 2 may be changed from the next time.

For example, in a case where the traveling environment of the relevant vehicle 2 is predicted to change from a traveling environment where the remote control value is unlikely to change greatly to a traveling environment where the remote control value is likely to change greatly, the server CPU 15 may determine to make the priority of the relevant vehicle 2 higher than that of another vehicle traveling in the traveling environment where the remote control value is unlikely to change greatly.

In another example, in a case where the traveling environment of the relevant vehicle 2 is predicted to change from a traveling environment where the remote control value is likely to change greatly to a traveling environment where the remote control value is unlikely to change greatly, the server CPU 15 may determine to lower the priority of the relevant vehicle 2 to a level similar to that of another vehicle traveling in the traveling environment where the remote control value is unlikely to change greatly.

Note that, in the processes of step ST36 and step ST37 described above, the server CPU 15 may predict the traveling environment of each vehicle 2 on the basis of the information received from each vehicle 2, and determine the priority corresponding to the target response cycle of each vehicle 2, depending on the predicted traveling environment of each vehicle 2.

In another example, the server CPU 15 may map the information received from the plurality of vehicles 2 on, for example, the high-precision map data, and determine a change in the traveling environment and the priority of each vehicle 2, on the basis of information on a vehicle other than the own vehicle or on the basis of a combination of such information.

In step ST38, the server CPU 15 may transmit the remote control value generated by the processes described above and the priority to the relevant vehicle 2 that has transmitted the vehicle information. The control system 3 of the vehicle 2 that has transmitted the vehicle information may be in a reception wait state for the remote control value in step ST4, after having transmitted the vehicle information in step ST3 of FIG. 5. The control system 3 of the vehicle 2 that has transmitted the vehicle information may execute the remote traveling control by using the remote control value received from the server 5 in step ST5.

Thereafter, the server CPU 15 may cause the flow to return to step ST31. The server CPU 15 of the server 5 of the remote control apparatus 4 may thus repeat the remote control illustrated in FIG. 9. This enables the server CPU 15 to keep generating and transmitting the remote control value corresponding to the latest traveling environment repeatedly, for each of the plurality of vehicles 2. The server CPU 15 may keep generating, for example, a steering amount remote control value for the lane keep control, and an acceleration or deceleration amount remote control value for the inter-vehicle distance control or vehicle speed control.

The server CPU 15 may repeat the processes to update the priority depending on the traveling environment of each vehicle 2, and generate the remote control value for each vehicle 2 in the target response cycle corresponding to the updated priority.

According to the unprocessed information list 70 in the state of FIG. 7, for example, the server CPU 15 may execute the control illustrated in FIG. 9 in order for the second record 72 from the top and the third record 73 from the top, because the first record 71 from the top does not include unprocessed vehicle information.

Although the second record 72 from the top has been received before the third record 73 from the top, the server CPU 15 may process the third record 73 from the top before the second record 72 from the top in accordance with the priority.

Figure 10:
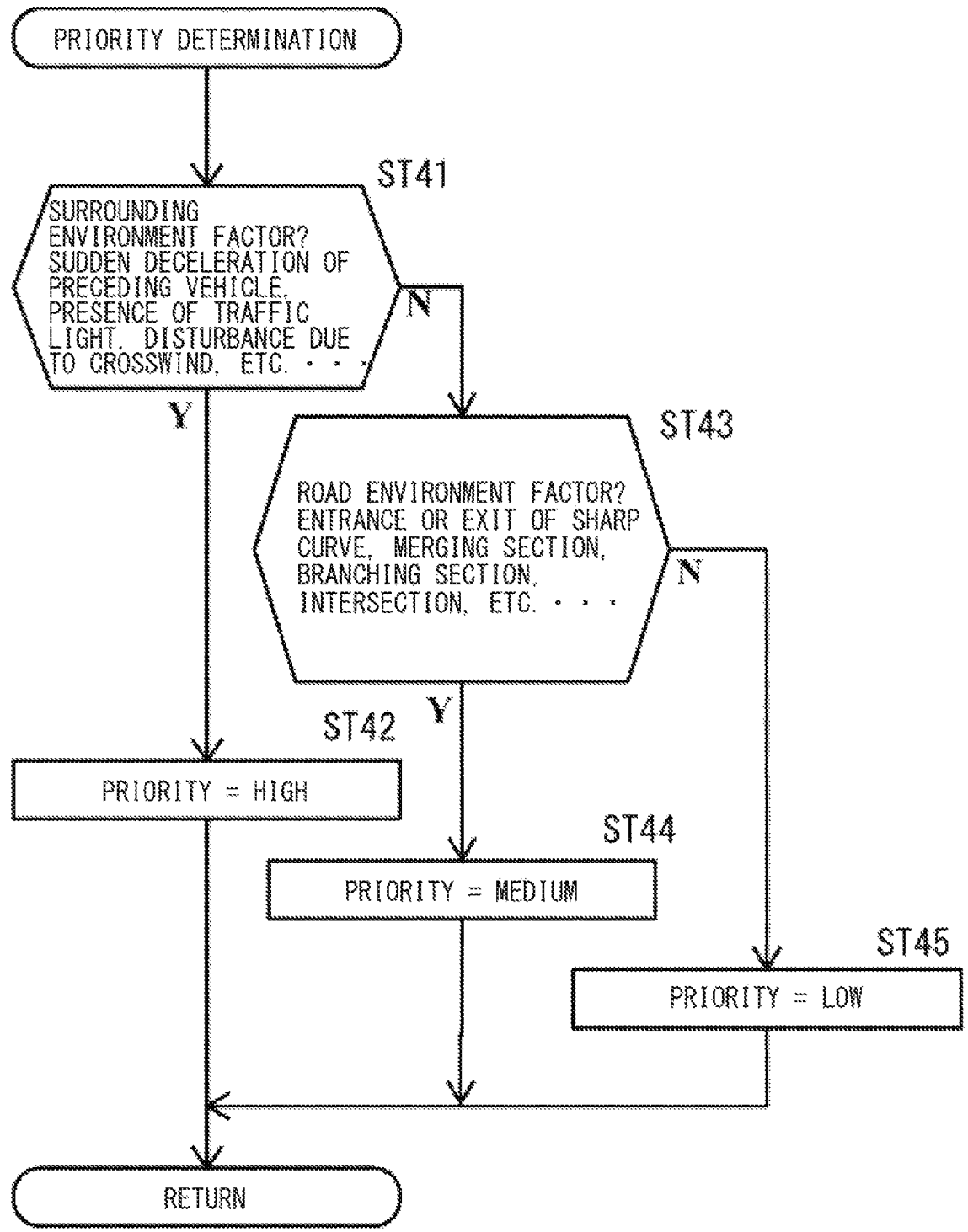
FIG. 10 is a flowchart illustrating control for priority determination to be performed by the server of the remote control apparatus illustrated in FIG. 1.

FIG. 10 is a flowchart illustrating control for priority determination to be performed by the server 5 of the remote control apparatus 4 illustrated in FIG. 1.

The server CPU 15 of the server 5 of the remote control apparatus 4 may repeatedly execute the priority determination illustrated in FIG. 10 as, for example, the processes of step ST36 and step ST37 of FIG. 9.

In step ST41, the server CPU 15 may determine presence or absence of a dynamic surrounding environment factor, as the traveling environment of the relevant vehicle 2.

Non-limiting examples of the dynamic surrounding environment factor may include whether the preceding vehicle 101 suddenly decelerates, presence or absence of a traffic light 102 in the traveling direction, and whether traveling is disturbed by, for example, crosswind. The server CPU 15 may determine the presence or absence of any of these dynamic surrounding environment factors by analyzing the captured image of the vehicle outside camera 63 acquired from each vehicle 2.

For example, in a case where a stop lamp of the preceding vehicle 101 included in a front captured image of the vehicle outside camera 63 changes from off to on, or the preceding vehicle 101 included in the captured image increases in size at a predetermined rate or greater, the server CPU 15 may determine that the preceding vehicle 101 is suddenly decelerating, indicating that a dynamic surrounding environment factor is present.

In a case where the traffic light 102 included in a front captured image of the vehicle outside camera 63 changes from blue to yellow or red, the server CPU 15 may determine that the vehicle 2 has to decelerate to stop before the traffic light 102 in the traveling direction, indicating that a dynamic surrounding environment factor is present.

In a case where an imaging position of the preceding vehicle 101 included in a front captured image of the vehicle outside camera 63 shifts sideways regardless of steering of the own vehicle, the server CPU 15 may determine that traveling is disturbed by, for example, crosswind, indicating that a dynamic surrounding environment factor is present.

In a case where a pedestrian 105 at a road shoulder included in a front captured image of the vehicle outside camera 63 is predicted to move into a roadway, the server CPU 15 may determine that the vehicle 2 has to stop to avoid the pedestrian 105, indicating that a dynamic surrounding environment factor is present.

If a dynamic surrounding environment factor is present (ST41: Y), the server CPU 15 may cause the flow to proceed to step ST42. If a dynamic surrounding environment factor is absent (ST41: N), the server CPU 15 may cause the flow to proceed to step ST43.

In step ST42, the server CPU 15 may determine that the priority of the relevant vehicle 2 is high. Thereafter, the server CPU 15 may end this control, and cause the flow to proceed to step ST38 of FIG. 9.

In step ST43, the server CPU 15 may determine presence or absence of a static road environment factor, as the traveling environment of the relevant vehicle 2. The static road environment factor may be an environment factor regarding the road 100. Non-limiting examples of the static road environment factor may include an entrance or an exit of a sharp curve, a merging section, a branching section, and an intersection. The server CPU 15 may determine the presence or absence of any of these static road environment factors by analyzing the captured image of the vehicle outside camera 63 acquired from each vehicle 2.

For example, in a case where a course along which the vehicle 2 is traveling is curved leftward or rightward in a front captured image of the vehicle outside camera 63, the server CPU 15 may determine that the vehicle 2 is traveling toward a curve, indicating that a static road environment factor is present.

In a case where a new adjacent lane appears in a front captured image of the vehicle outside camera 63, the server CPU 15 may determine that the vehicle 2 is traveling toward a merging section or a branching section, indicating that a static road environment factor is present.

In a case where the road 100 extending in a direction different from the traveling direction appears in a front captured image of the vehicle outside camera 63, the server CPU 15 may determine that the vehicle 2 is traveling toward an intersection, indicating that a static road environment factor is present.

If a static road environment factor is present (ST43: Y), the server CPU 15 may cause the flow to proceed to step ST44. If a static road environment factor is absent (ST43: N), the server CPU 15 may cause the flow to proceed to step ST45.

In step ST44, the server CPU 15 may determine that the priority of the relevant vehicle 2 is medium. Thereafter, the server CPU 15 may end this control, and cause the flow to proceed to step ST38 of FIG. 9.

In step ST45, the server CPU 15 may determine that the priority of the relevant vehicle 2 is low. Thereafter, the server CPU 15 may end this control, and cause the flow to proceed to step ST38 of FIG. 9.

Thus, in a case where deceleration of the preceding vehicle 101, the traffic light 102 in the traveling direction, an entrance or an exit of a curve, a merging section, a branching section, or an intersection is predicted to occur, for example, in the traveling environment of each vehicle 2, the server CPU 15 of the server 5 of the remote control apparatus 4 may update the priority and the target response cycle to allow the vehicle 2 to be subjected to processing preferentially over another vehicle with a low priority not present in any of such traveling environments.

Figure 11:
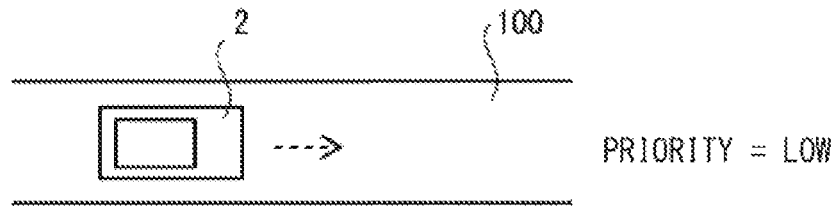
FIG. 11 is an explanatory diagram illustrating priorities in traveling environments of the vehicle.
Figure 11:
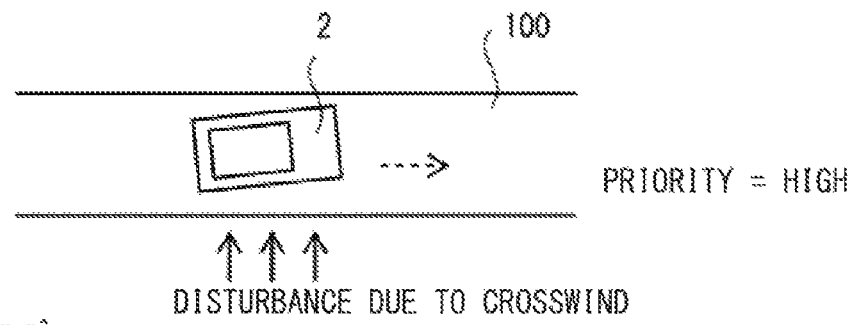
Figure 11:
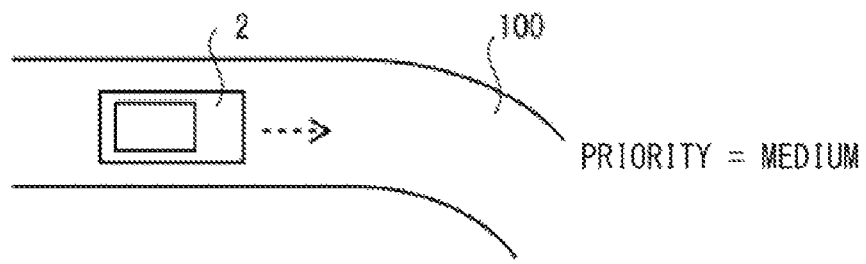
Figure 11:
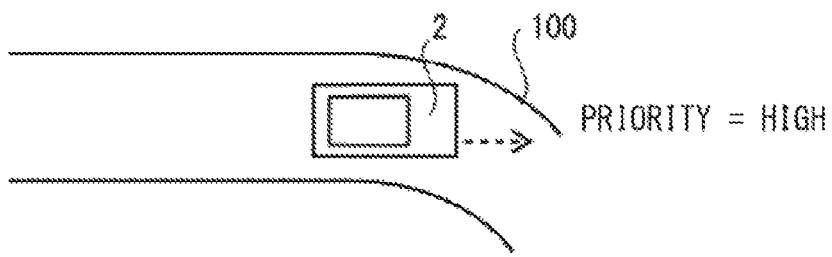
Figure 11:
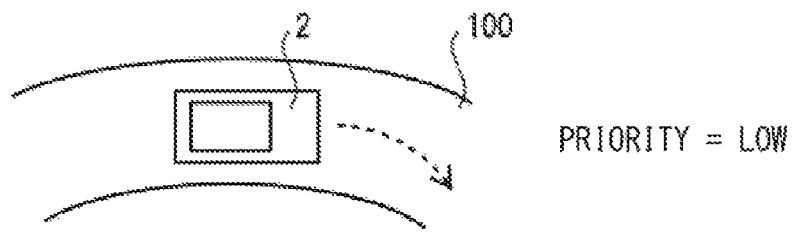

FIG. 11 is an explanatory diagram illustrating priorities in traveling environments of the vehicle 2.

Figure 12:
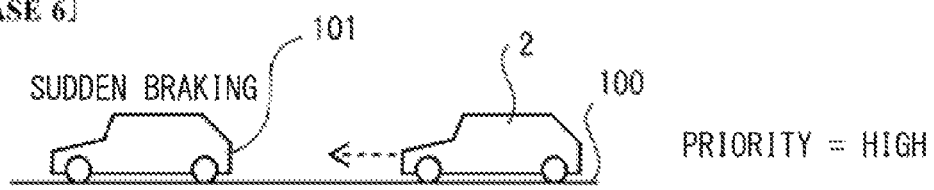
FIG. 12 is an explanatory diagram illustrating priorities in other traveling environments of the vehicle.
Figure 12:
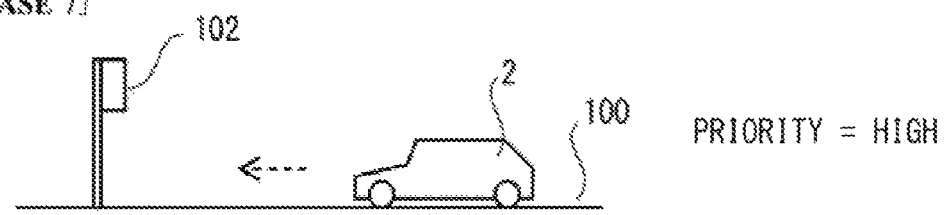
Figure 12:
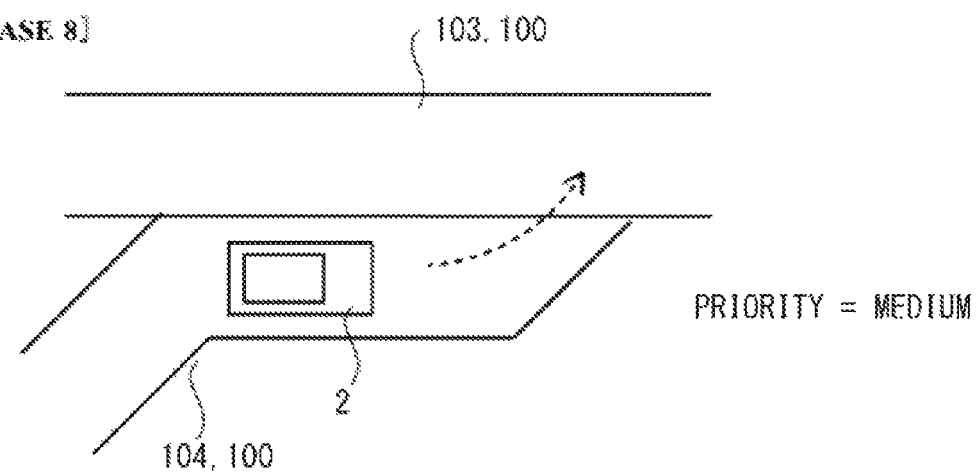
Figure 12:
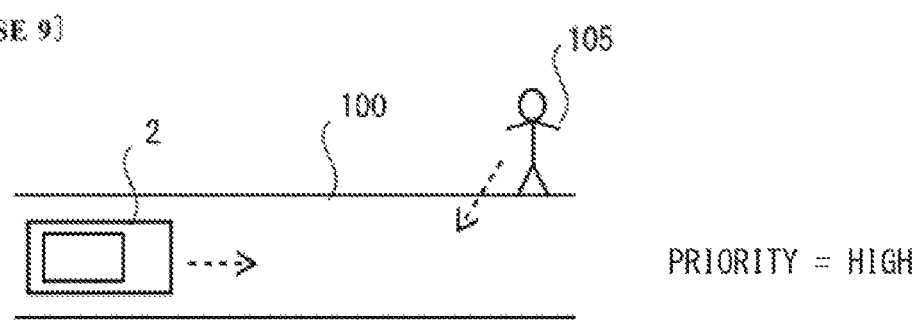

FIG. 12 is an explanatory diagram illustrating priorities in other traveling environments of the vehicle 2.

FIGS. 11 and 12 illustrate the traveling environments of the vehicle 2 as cases 1 to 9.

In case 1, the vehicle 2 may be traveling on the straight road 100. In this case, the vehicle 2 may not be in a traveling environment where the control value is to be changed abruptly and greatly. The server CPU 15 may determine the low priority for the vehicle 2 in case 1.

In case 2, the vehicle 2 traveling on the straight road 100 may be disturbed by crosswind. In this case, for the vehicle 2, it may be necessary to abruptly and greatly change a steering control value, for example, to return a change in attitude due to the crosswind. The server CPU 15 may determine the high priority for the vehicle 2 in case 2.

In case 3, the vehicle 2 may be traveling on the straight road 100 toward an entrance of a corner. For the vehicle 2, it may be necessary to subsequently change the steering control value, for example, at the entrance of the corner. The server CPU 15 may determine the medium priority for the vehicle 2 in case 3.

In case 4, the vehicle 2 may be deviating outward on the curved road 100 at an entrance of a corner. In this case, for the vehicle 2, it may be necessary to abruptly and greatly change the steering control value and a deceleration control value to enable the vehicle 2 to travel while keeping the middle of a lane of the road 100. The server CPU 15 may determine the high priority for the vehicle 2 in case 4.

In case 5, the vehicle 2 may be traveling along the curved road 100, while keeping the middle of the lane of the road 100. In this case, the vehicle 2 may not be in a traveling environment where the control value is to be changed abruptly and greatly. The server CPU 15 may determine the low priority for the vehicle 2 in case 5.

In case 6, the preceding vehicle 101 traveling ahead of the vehicle 2 may be executing sudden braking control. In this case, for the vehicle 2, it may be necessary to abruptly and greatly change the deceleration control value to keep the distance between the vehicle 2 and the preceding vehicle 101. The server CPU 15 may determine the high priority for the vehicle 2 in case 6.

In case 7, the traffic light 102 may be present in the traveling direction of the road 100 on which the vehicle 2 is traveling. If the traffic light 102 changes from blue to yellow or red in this case, it may be necessary to change the deceleration control value for the vehicle 2 to enable the vehicle 2 to stop before the traffic light 102. The server CPU 15 may determine the high priority for the vehicle 2 in case 7.

In case 8, the vehicle 2 may be traveling in a merging section of a merging lane 104 that merges with a main lane 103. In this case, for the vehicle 2, it may be necessary to change the steering control value, for example, to cause the vehicle 2 to move from the merging lane 104 to the main lane 103. The server CPU 15 may determine the medium priority for the vehicle 2 in case 8.

In case 9, the pedestrian 105 may be present at a road shoulder of the straight road 100 on which the vehicle 2 is traveling. The pedestrian 105 can subsequently step into the road 100 on which the vehicle 2 is traveling. In this case, for the vehicle 2, it may be necessary to change the steering control value and the deceleration control value to cause the vehicle 2 to stop to avoid the pedestrian 105. The server CPU 15 may determine the high priority for the vehicle 2 in case 9.

As described above, the server CPU 15 may determine the low priority for the vehicle 2 present in a traveling environment where the remote control value is less likely to change abruptly and greatly, and determine the medium or high priority for the vehicle 2 present in a traveling environment where the remote control value is likely to change abruptly and greatly. In addition, the server CPU 15 may change the target response cycle in which the remote control value is to be repeatedly generated for each vehicle 2, in response to a change in the traveling environment during the traveling. This prevents high processing load from being imposed on the server CPU 15, unlike in a case of repeatedly generating the remote control value with the high priority for all of the plurality of vehicles 2. For the vehicle 2 that desires the remote control value in the target response cycle corresponding to the high priority, it is possible to repeatedly generate the remote control value in the desired cycle.

For example, in a case where the vehicle 2 is traveling on the straight road 100 in the traveling environment of case 1, the server CPU 15 may determine the low priority, repeatedly generate a remote control value in a relatively long cycle, and transmit the remote control value to the vehicle 2. During the remote control, in a case where the vehicle 2 is subjected to crosswind as in the traveling environment of case 2, the server CPU 15 may determine the high priority, repeatedly generate a remote control value in a short cycle, and transmit the remote control value to the vehicle 2. The vehicle 2 that is subjected to the crosswind while traveling on the straight road 100 can temporarily deviate sideways from the middle of the lane by being disturbed by the crosswind. Even in that case, the remote control value may thereafter be frequently updated in a short cycle, which enables the vehicle 2 to return to the middle of the lane and continue the traveling, without departing from the lane.

In another example, the vehicle 2 can travel, from a state of traveling on the straight road 100 as in case 1 described above, toward an entrance of a corner as in case 3. In this case, the server CPU 15 of the remote control apparatus 4 may change the priority for the vehicle 2 traveling toward the entrance of the corner from low to medium. Upon determining the medium priority, the server CPU 15 may repeatedly generate a remote control value in a relatively short cycle, and transmit the remote control value to the vehicle 2. Thus, the vehicle 2 that travels from the straight road 100 to the entrance of the corner is able to obtain an appropriate speed and steering angle on the basis of the remote control even at the entrance of the corner, thus being able to keep traveling while keeping the middle of the lane of the curved road 100.

In another example, while the vehicle 2 is traveling on the straight road 100 in the traveling environment of case 1, the pedestrian 105 can appear at a road shoulder of the road 100 as in case 9. The pedestrian 105 can cross the road 100 in front of the vehicle 2. In this case, the server CPU 15 may determine the medium priority for the vehicle 2, repeatedly generate a remote control value in a relatively short cycle, and transmit the remote control value to the vehicle 2. Thus, even if the pedestrian 105 crosses the road 100 immediately before the vehicle 2, the vehicle 2 is able to sufficiently decelerate before reaching the pedestrian 105, and stop before a position where the pedestrian 105 crosses the road 100.

As described above, in the example embodiment, the remote control apparatus 4 is configured to repeatedly transmit, to each of the plurality of vehicles 2, the remote control value to be used to control the traveling of the vehicle 2. The remote control apparatus 4 generates the remote control value to be repeatedly generated for each vehicle 2 by the remote control value generator 6, in accordance with the priority or the target response cycle changed depending on the traveling environment of each vehicle 2. For example, in a case where the traveling environment of each vehicle 2 is predicted to become a traveling environment where the remote control value is likely to change greatly, the remote control apparatus 4 may update the priority or the target response cycle to allow the vehicle 2 to be subjected to processing preferentially over another vehicle present in a traveling environment where the remote control value is unlikely to change greatly. Thus, the remote control value to be repeatedly generated for each vehicle 2 is able to be generated at an appropriate timing corresponding to the traveling environment of each vehicle 2. For example, the traveling environment of each vehicle 2 may be a case where the preceding vehicle 101 decelerates, a case where the traffic light 102 is present in the traveling direction, a case where the vehicle 2 travels toward an entrance or an exit of a curve, a case where the vehicle 2 travels in a merging section, a case where the vehicle 2 travels toward an intersection, or a case where crosswind blows. In such traveling environments, the remote control value may be generated for the vehicle 2 preferentially over another vehicle not present in any of the traveling environments.

Consequently, in the example embodiment, each of the plurality of vehicles 2 whose traveling is remotely controlled by the remote control system 1 for the traveling of the vehicle 2 is able to receive the remote control value to be used for the traveling control of the vehicle 2 at an appropriate timing and use the remote control value for the control, even in a case of traveling in a traveling environment where the remote control value is likely to change greatly, as in a case of traveling in a traveling environment where the remote control value is unlikely to change greatly. The vehicle 2 whose traveling is remotely controlled by the remote control system 1 for the traveling of the vehicle 2 according to the example embodiment is able to keep controlling the traveling of the own vehicle appropriately even in a case where the traveling environment changes.

Second Example Embodiment

Described next is the remote control system 1 for the traveling of the vehicle 2 according to a second example embodiment of the technology. The remote control system 1 according to the example embodiment may be configured to switch between and provide, to the vehicle 2, the remote control value to be used for the remote control and the traveling control information available for the own vehicle control. Mainly described below are differences from the example embodiments described above.

Figure 13:
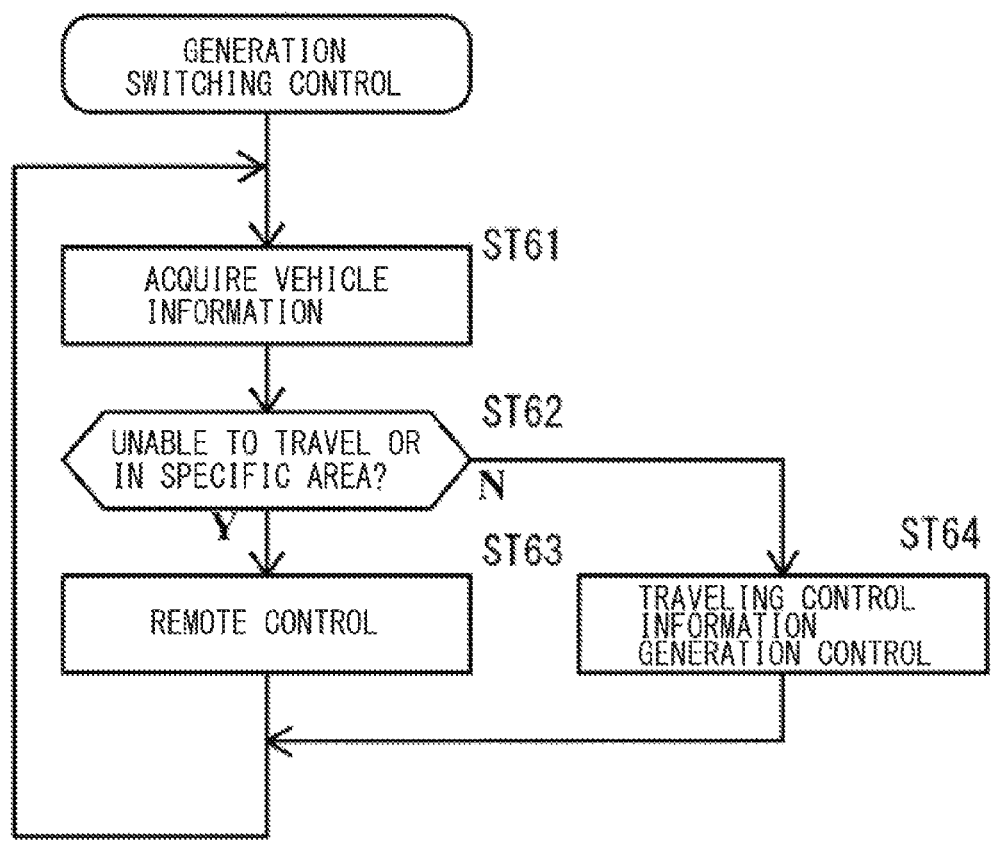
FIG. 13 is a flowchart illustrating generation switching control to be performed by the server of the remote control apparatus of the remote control system for the traveling of the vehicle, according to one example embodiment of the technology.

FIG. 13 is a flowchart illustrating generation switching control to be performed by the server 5 of the remote control apparatus 4 of the remote control system 1 for the traveling of the vehicle 2, according to the second example embodiment of the technology.

The server CPU 15 of the server 5 of the remote control apparatus 4 may continuously execute the switching control illustrated in FIG. 13 to provide, by switching, one of the remote control value or the traveling control information to each of the plurality of vehicles 2.

In step ST61, the server CPU 15 may acquire unprocessed vehicle information from, for example, the unprocessed information list 70 held in the server memory 14. The server CPU 15 may select the most urgent vehicle information of the vehicle 2 closest to expiration in the unprocessed information list 70, as in step ST32.

In step ST62, the server CPU 15 may first determine whether the vehicle 2 whose vehicle information has been acquired is in a state of being unable to travel.

In the vehicle 2, in a case where a malfunction occurs in the traveling control ECU 24 serving as the own vehicle control value generating unit, for example, it can become difficult to generate, in an appropriate cycle, the control value for automatic driving by the own vehicle. Generating the control value for automatic driving is assumed to be high-load processing.

Even in the vehicle 2 under manual driving, in a case where a trouble involving the occupant, such as a driver who drives the vehicle 2, occurs, it can become difficult for the traveling control ECU 24 to generate the own vehicle control value on the basis of a manual operation.

In a case where such a state of being unable to travel occurs, the traveling control ECU 24 may include the inability state in the vehicle information, and transmit the vehicle information to the server 5 of the remote control apparatus 4.

The server CPU 15 may determine such an inability state on its own on the basis of the captured image of the vehicle inside camera 65, for example, included in the vehicle information acquired from the vehicle 2.

The server CPU 15 may, in step ST62, further determine another state as well, instead of determining only that the vehicle 2 whose vehicle information has been acquired is in a state of being unable to travel.

The server CPU 15 may determine, for example, whether an area in which the vehicle 2 whose vehicle information has been acquired is traveling is a specific area set to prioritize the remote control.

The specific area may be set, for example, for a place where remote traveling control is able to achieve lower accident risk than autonomous traveling control. In one example, it is assumable that the specific area is set for a low-visibility intersection, an automatic parking area, or a place whose infrastructure information is available only to a server, for example.

Note that the server CPU 15 may determine only one of the state of being unable to travel or the specific area in step ST62.

The server CPU 15 may determine a traveling situation of the vehicle 2 other than the specific area described above. Non-limiting examples of the traveling situation of the vehicle 2 other than the specific area may include a case where a traffic light is present in the traveling direction, a case where the vehicle 2 travels toward an entrance or an exit of a curve, a case where the vehicle 2 travels in a merging section, and a case where the vehicle 2 travels toward an intersection. The server CPU 15 may determine a traveling situation of the vehicle 2 that changes dynamically. Non-limiting examples of the traveling situation of the vehicle 2 that changes dynamically may include a case where a preceding vehicle decelerates and a case where crosswind blows.

If the vehicle 2 whose vehicle information has been acquired is in a state of being unable to travel or is traveling in the specific area (ST62: Y), the server CPU 15 may cause the flow to proceed to step ST63 for the remote control.

If the vehicle 2 whose vehicle information has been acquired is not in a state of being unable to travel and is not traveling in the specific area (ST62: N), the server CPU 15 may cause the flow to proceed to step ST64 to assist autonomous control of the own vehicle.

In step ST63, the server CPU 15 may execute the remote control. The server CPU 15 may execute the processes of, for example, step ST34 to step ST38 in FIG. 9, and transmit the generated remote control value and the priority to the vehicle 2 that has transmitted the vehicle information. The server CPU 15 may execute the server remote control illustrated in FIG. 9 as a part of the switching control illustrated in FIG. 13. For the vehicle 2 whose inability has been determined, the remote control value generator 6 may generate the remote control value to be used for the traveling control of the vehicle 2. Thereafter, the server CPU 15 may cause the flow to return to step ST61.

This remote control may be executed by the server CPU 15, because the vehicle 2 is in a state of being unable to travel. The server CPU 15 may generate the remote control value to be used to guide the vehicle 2 in a state of being unable to travel. The remote control value may cause the vehicle 2 to stop on the road 100 on which the vehicle 2 is traveling, to pull over to a road shoulder and stop, or move to a first-aid facility such as a hospital.

In step ST64, the server CPU 15 may execute control of generating the traveling control information available for the traveling control ECU 24 of the vehicle 2 to generate the own vehicle control value. Thereafter, the server CPU 15 may cause the flow to return to step ST61.

As described above, the server CPU 15 of the server 5 of the remote control apparatus 4 may execute a generation process for each vehicle 2, by switching between remote control value generation control and traveling control information generation control, depending on whether the vehicle 2 is in a state of being unable to travel. In a case where inability regarding each vehicle 2 is determined, the server CPU 15 may switch the generation process for the vehicle 2 from the traveling control information generation control to the remote control value generation control. In one embodiment, the server CPU 15 may serve as a "traveling control information generating unit". In one embodiment, the server CPU 15 may serve as a "switching control unit".

Figure 14:
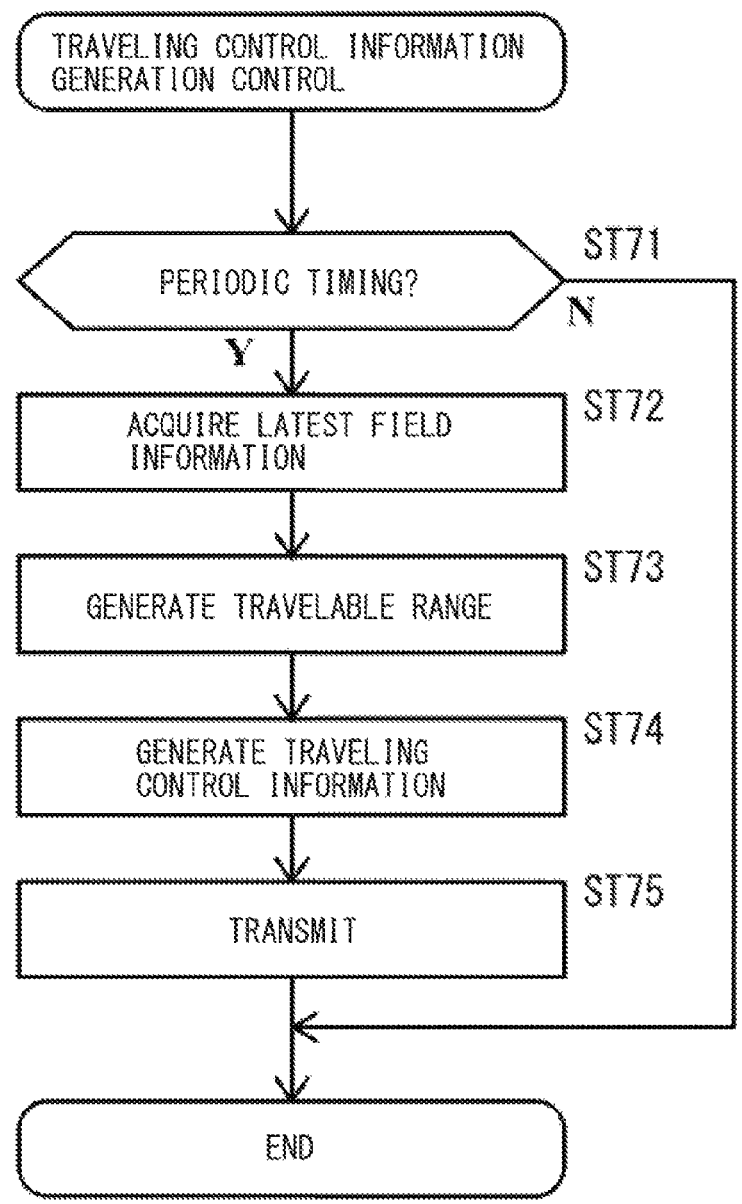
FIG. 14 is a flowchart illustrating traveling control information generation control to be performed by the server of the remote control apparatus.

FIG. 14 is a flowchart illustrating the traveling control information generation control to be performed by the server 5 of the remote control apparatus 4.

The server CPU 15 of the server 5 of the remote control apparatus 4 may repeatedly execute the traveling control information generation control illustrated in FIG. 14, for the plurality of vehicles 2 for which the traveling control information is to be generated by the remote control apparatus 4.

The vehicle 2 relevant to step ST64 of FIG. 13 may be the vehicle 2 for which the traveling control information is to be generated by the remote control apparatus 4.

In step ST71, the server CPU 15 may determine whether a periodic timing for generation of the traveling control information has arrived. The traveling control information may be, for example, information on a travelable range in which the vehicle 2 is estimated to be able to move within a predetermined period of time. In this case, the server CPU 15 may determine whether the periodic timing has arrived that is shorter than time predicted to be taken for the vehicle 2 to reach the boundary of the travelable range. If the periodic timing at which the traveling control information is to be generated has not arrived (ST71: N), the server CPU 15 may end this control. If the periodic timing at which the traveling control information is to be generated has arrived (ST71: Y), the server CPU 15 may cause the flow to proceed to step ST72.

In step ST72, the server CPU 15 may acquire the latest field information. The field information may include, for example, movement speed and direction included in the vehicle information of the traveling plurality of vehicles 2, and traffic information in a region that is managed by the remote control apparatus 4.

In step ST73, the server CPU 15 may map the positions of the plurality of vehicles 2 in the virtual space based on the high-precision map data, for example, and generate the range in which each of the mapped vehicles 2 is able to travel and the direction in which each of the mapped vehicles 2 is able to travel.

In step ST74, the server CPU 15 may generate traveling control information of each vehicle 2 including information on the travelable range and the travelable direction generated for each vehicle 2. The traveling control information may include, for example, information on the priority.

In step ST75, the server CPU 15 may transmit, to each vehicle 2, the traveling control information generated for each of the plurality of vehicles 2 in step ST74. This enables the plurality of vehicles 2 to each obtain, as the traveling control information of the vehicle 2 in step ST10, information useful for the traveling control regarding, for example, the range in which the vehicle 2 is able to travel and the direction in which the vehicle 2 is able to travel.

Figure 15:
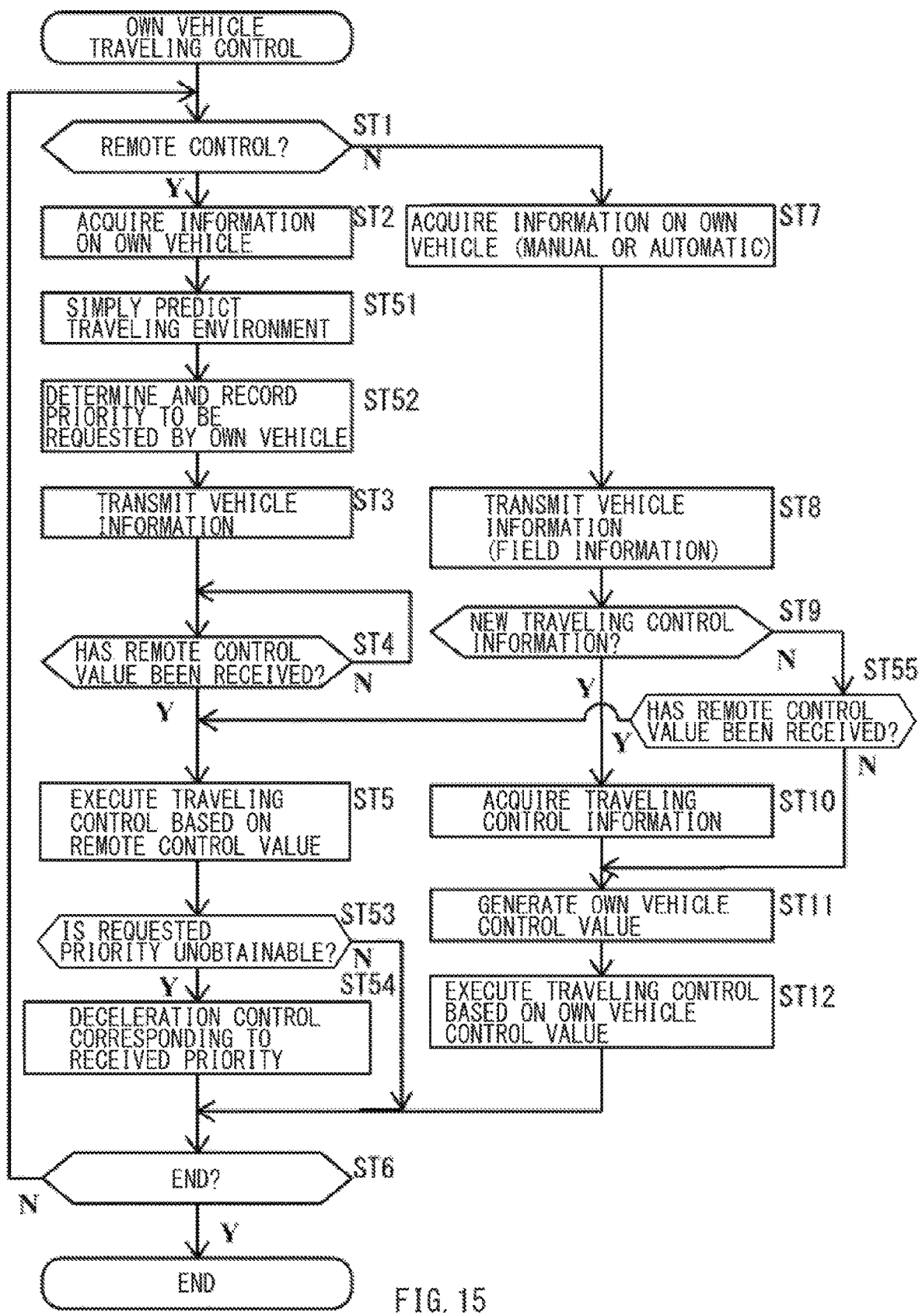
FIG. 15 is a flowchart illustrating the own vehicle traveling control to be performed by the control system of the vehicle, according to one example embodiment of the technology.

FIG. 15 is a flowchart illustrating the own vehicle traveling control to be performed by the control system 3 of the vehicle 2, according to the second example embodiment of the technology.

The traveling control ECU 24 of the control system 3 of the vehicle 2 may repeatedly execute the own vehicle traveling control illustrated in FIG. 15 to control the traveling of the own vehicle.

Note that a control ECU other than the traveling control ECU 24 of the control system 3 of the vehicle 2, such as the remote control ECU 29 indicated by the dashed line in FIG. 3, may repeatedly execute some processes of the own vehicle traveling control illustrated in FIG. 15, for example, processes from step ST2 to ST54 of FIG. 15.

Step ST1 to step ST12 may be similar to those in FIG. 5.

After acquiring the vehicle information of the own vehicle in step ST2, the traveling control ECU 24 may cause the flow to proceed to step ST51.

In step ST51, the traveling control ECU 24 may simply predict the traveling environment of the own vehicle, on the basis of the acquired vehicle information of the own vehicle.

In step ST52, the traveling control ECU 24 may determine the priority that the own vehicle is to request of the remote control apparatus 4, depending on the simply predicted traveling environment of the own vehicle. The traveling control ECU 24 may record the determined priority in the memory 41.

The priority determination in each vehicle 2 in step ST51 and step ST52 may be similar to the determination in FIG. 10, or may be made simpler than the determination in FIG. 10.

Thereafter, the traveling control ECU 24 may cause the flow to proceed to step ST3.

The traveling control ECU 24 serving as the traveling control unit of each vehicle 2 may transmit, to the remote control apparatus 4, a request for processing with the priority determined by the own vehicle.

The server CPU 15 of the server 5 of the remote control apparatus 4 may receive, from the vehicle 2, the priority temporarily determined by the vehicle 2 together with the vehicle information.

The server CPU 15 may acquire the received priority in step ST22 of the server reception control illustrated in FIG. 6, and register the priority in the unprocessed information list 70.

In step ST37 of the server remote control illustrated in FIG. 9, the server CPU 15 may determine the priority of each vehicle 2 on the basis of the traveling environment of each vehicle 2 determined in step ST36, and compare the determined priority with the priority received from the vehicle 2.

In a case where the received priority is higher than the self-determined priority, the server CPU 15 may determine whether the processing load on the remote control apparatus 4 including load of processing for other vehicles has a margin. In a case where the processing load has a margin, the server CPU 15 may determine the received priority as a final priority. In a case where the processing load has no margin, the server CPU 15 may determine the self-determined priority as the final priority.

In a case where the received priority matches the self-determined priority or is lower than the self-determined priority, the server CPU 15 may determine the self-determined priority as the final priority.

Note that, also in a case where the server CPU 15 determines the self-determined priority as the final priority, the server CPU 15 may determine whether the processing load on the remote control apparatus 4 has a margin.

After executing the traveling control based on the remote control value in step ST5, the traveling control ECU 24 may cause the flow to proceed to step ST53.

In step ST53, the traveling control ECU 24 may determine whether the priority requested by the own vehicle has been obtained in the remote control performed by the server 5 of the remote control apparatus 4. The traveling control ECU 24 may acquire the priority in the server 5 included in information received from the server 5 of the remote control apparatus 4, and compare the acquired priority with the priority recorded in the memory 41 in step ST52. If the priority in the server 5 is lower than the priority held in the memory 41 (ST53: Y), the traveling control ECU 24 may cause the flow to proceed to step ST54, assuming that the requested priority has not been obtained. Otherwise (ST53: N), the traveling control ECU 24 may cause the flow to proceed to step ST6.

In step ST54, because the priority in the server 5 is lower than the requested priority, the traveling control ECU 24 may generate the own vehicle control value for deceleration of the own vehicle and execute deceleration control using the own vehicle control value, to reduce the possibility of deviating from the control due to a delay in receiving the remote control value. The priority may have three levels of high, medium, and low, for example, as illustrated in FIG. 8. The target response cycle may be associated with each priority. The traveling control ECU 24 may generate the own vehicle control value for deceleration to a speed that prevents deviation from the control even in the target response cycle corresponding to the priority in the server 5. Such a limiting speed corresponding to each priority may be held in the memory 41 in advance, for example, as the priority table 80 of FIG. 8. The limiting speed corresponding to the priority may be a speed for stopping of the vehicle 2. Thereafter, the traveling control ECU 24 may cause the flow to proceed to step ST6.

If it is determined that new traveling control information has not been received from the remote control apparatus 4 in step ST9 (ST9: N), the traveling control ECU 24 may cause the flow to proceed to step ST55.

In step ST55, the traveling control ECU 24 may determine whether a remote control value has been received, instead of traveling control information, from the remote control apparatus 4. In a case where the server 5 of the remote control apparatus 4 determines that the vehicle 2 is in a state of being unable to travel in step ST62 of the switching control illustrated in FIG. 13, the server 5 may execute the remote control in step ST63, instead of the traveling control information generation control in step ST64. In this case, the server 5 of the remote control apparatus 4 may transmit the remote control value this time to the vehicle 2 to which the traveling control information has been transmitted previously.

If a remote control value has been received as new information from the server 5 (ST55: Y), the traveling control ECU 24 may cause the flow to proceed to step ST5, and execute the traveling control based on the remote control value.

If a remote control value has not been received as new information from the server 5 (ST55: N), the traveling control ECU 24 may cause the flow to proceed to step ST11, generate the own vehicle control value, and execute the traveling control based on the own vehicle control value.

As described above, in a case where the remote control value is received from the remote control apparatus 4, the traveling control ECU 24 serving as the traveling control unit of each vehicle 2 may preferentially use, for the traveling control of the vehicle 2, the remote control value over the own vehicle control value generated by the own vehicle.

In a case where the requested priority is not obtained in the remote control apparatus 4, the traveling control ECU 24 may execute the deceleration control corresponding to the priority in the remote control apparatus 4.

For example, in a case where the vehicle 2 is traveling toward an entrance of a corner as in case 3 described above, the vehicle 2 may request the medium priority but only the low priority may be obtained as a result of the determination by the server CPU 15 of the remote control apparatus 4. This can result in a traveling environment where the vehicle 2 travels to depart from the lane at the entrance of the corner. However, in such a case, the vehicle 2 is able to buy time before departing from the lane by executing the deceleration control in step ST54. In addition, the server CPU 15 of the remote control apparatus 4 is able to determine the possibility of departure in subsequent determination, and determine the high priority instead of the medium priority. Upon determining the high priority, the server CPU 15 may repeatedly generate a remote control value in a short cycle, and transmit the remote control value to the vehicle 2. Thus, for the vehicle 2 that has once become likely to depart from the lane at the entrance of the corner, the remote control value may thereafter be frequently updated in a short cycle. This enables the vehicle 2 to enter and pass through the corner to return to the middle of the lane without departing from the lane.

Third Example Embodiment

Described next is the remote control system 1 for the traveling of the vehicle 2 according to a third example embodiment of the technology. The remote control system 1 according to the example embodiment may differ from the example embodiments described above in adaptive control of the vehicle 2 and control of the server 5 of the remote control apparatus 4 corresponding to the adaptive control of the vehicle 2. The adaptive control of the vehicle 2 may be executed to adapt to a case where the vehicle 2 requests the priority in the remote control as with the own vehicle traveling control illustrated in FIG. 15, as in the second example embodiment, but the server 5 of the remote control apparatus 4 determines not to execute processing with the requested priority. Mainly described below are differences from the example embodiments described above.

Figure 16:
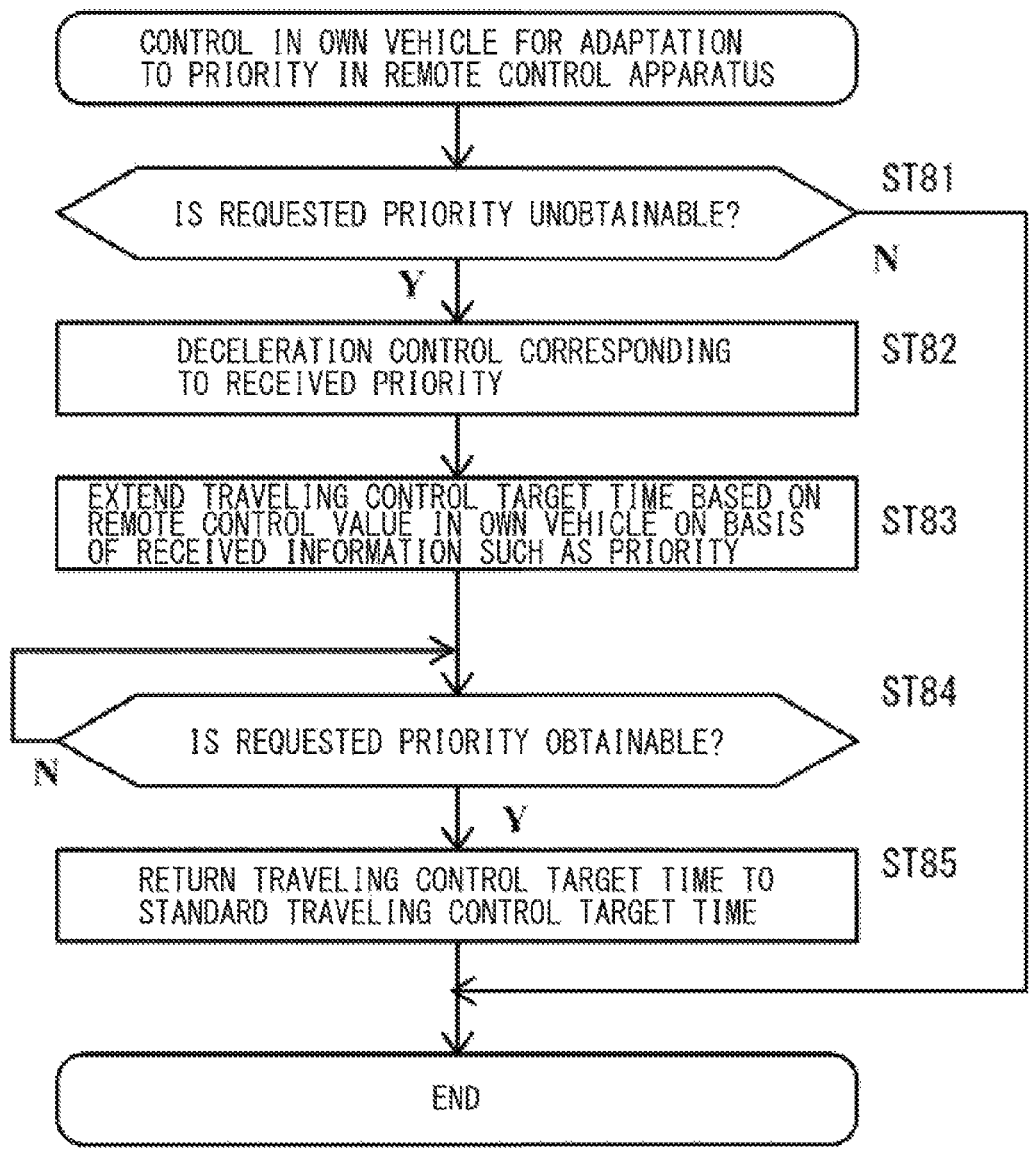
FIG. 16 is a flowchart illustrating control for adaptation to the priority determined by the remote control apparatus, to be performed by the control system of the vehicle, according to one example embodiment of the technology.

FIG. 16 is a flowchart illustrating the control for adaptation to the priority determined by the remote control apparatus 4, to be performed by the control system 3 of the vehicle 2, according to the third example embodiment of the technology.

The traveling control ECU 24 of the control system 3 of the vehicle 2 may repeatedly execute the control for adaptation to the priority illustrated in FIG. 16, as an example of the traveling control of the own vehicle.

The traveling control ECU 24 may execute the control for adaptation to the priority illustrated in FIG. 16, in place of the processes of step ST53 and step ST54 of FIG. 15.

In step ST81, the traveling control ECU 24 of the control system 3 of the vehicle 2 may determine whether the priority requested by the own vehicle has been obtained in the remote control performed by the server 5 of the remote control apparatus 4. The traveling control ECU 24 may acquire the priority in the server 5 included in the information received from the server 5 of the remote control apparatus 4, and compare the acquired priority with the priority recorded in the memory 41 in step ST52 of FIG. 15. If the priority in the server 5 is lower than the priority held in the memory 41 (ST81: Y), the traveling control ECU 24 may cause the flow to proceed to step ST82, assuming that the requested priority has not been obtained. Otherwise (ST81: N), the traveling control ECU 24 may end this control, because the requested priority has been obtained.

In step ST82, the traveling control ECU 24 may execute the deceleration control of decelerating to the speed corresponding to the received priority. Because the priority in the server 5 is lower than the requested priority, the traveling control ECU 24 may temporarily generate, on its own, the own vehicle control value for deceleration from the current vehicle speed to the speed corresponding to the priority, and execute the deceleration control using the own vehicle control value, although the remote control is ongoing. This makes it possible to reduce the possibility of the vehicle 2 traveling beyond a section for which the remote control value has been generated by the remote control value generator 6 of the remote control apparatus 4.

In step ST83, the traveling control ECU 24 may extend its traveling control target time for steering, for example, under the remote control, from standard traveling control target time, on the basis of the information received from the remote control apparatus 4. The standard traveling control target time may be set to, for example, several times to several tens of times a reference control cycle. The standard traveling control target time may be made to match the reference control cycle.

Such standard traveling control target time may basically correspond suitably to a cycle in which the traveling control ECU 24 of the vehicle 2 receives the remote control value from the remote control apparatus 4 (i.e., the transmission cycle in FIG. 4). The standard traveling control target time may be set to several times to several tens of times the reference control cycle. The traveling control ECU 24 may extend, for example, a cycle in which the traveling control ECU 24 transmits the vehicle information (i.e., the reception cycle in FIG. 4), from a standard cycle. In a case where the cycle in which the traveling control ECU 24 transmits the vehicle information is extended, the reception cycle and the transmission cycle in FIG. 4 are also extended, resulting in extension of the traveling control cycle.

The traveling control ECU 24 may use, for example, the priority in the server 5 as the information received from the remote control apparatus 4. The server 5 may have approved or rejected the priority request from each vehicle 2 depending on communication delay, for example. Communication or processing load on the server 5 can be tightening. Accordingly, in a case where the requested priority is not obtained in the server 5, the traveling control ECU 24 may extend the traveling control target time, depending on the priority in the server 5 lower than the requested priority. An amount of extension of the traveling control target time may be set in advance for each priority and recorded in the memory 41, or may be obtained by calculation corresponding to the communication delay, an amount of increase in the cycle, or the traveling environment.

In step ST84, the traveling control ECU 24 may determine whether the priority requested by the own vehicle has become obtainable in the server 5 thereafter. The server 5 may once reject the priority requested by the vehicle 2, but may change the priority in the server 5 in response to, for example, a reduction in load resulting from a change in subsequent communication environment or processing environment of the remote control apparatus 4. In this case, the traveling control ECU 24 is able to obtain the priority requested by the own vehicle, as the priority in the server 5.

If the priority requested by the own vehicle has not become obtainable in the server 5 (ST84: N), the traveling control ECU 24 may repeat this process.

If the priority requested by the own vehicle becomes obtainable in the server 5 (ST84: Y), the traveling control ECU 24 may cause the flow to proceed to step ST85.

In step ST85, the traveling control ECU 24 may return the traveling control target time extended in step ST83 to the original standard traveling control target time. Thus, in a period during which the priority requested by the own vehicle is not obtainable in the server 5, the traveling control ECU 24 is able to extend the traveling control cycle, making it possible to suppress overflow of the load on the server 5.

Figure 17:
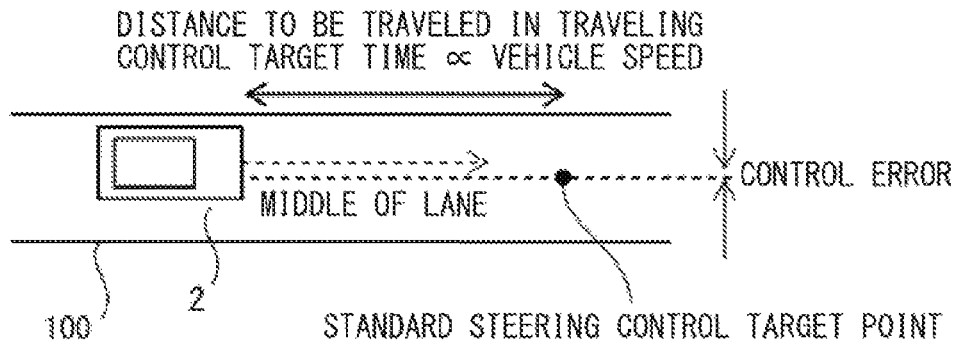
FIG. 17 is an explanatory diagram illustrating favorable examples of correspondence between a control target point that the server of the remote control apparatus sets for a remote control value generator, and a traveling control cycle in remote control for the vehicle, according to one example embodiment of the technology.
Figure 17:
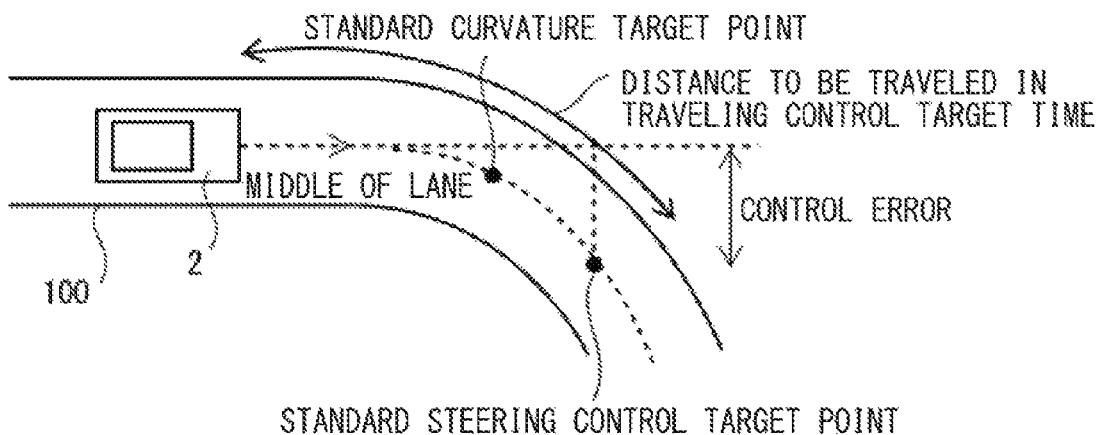
Figure 17:
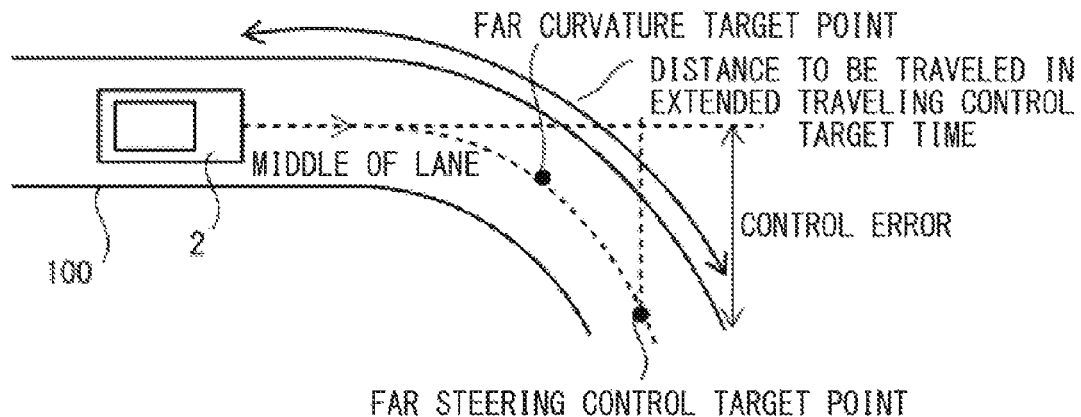

FIG. 17 is an explanatory diagram illustrating favorable examples of correspondence between a control target point that the server 5 of the remote control apparatus 4 sets for the remote control value generator 6, and the traveling control cycle in the remote control for the vehicle 2, according to the third example embodiment of the technology.

The server CPU 15 of the server 5 of the remote control apparatus 4 may set the control target point and a curvature target point farther than normal target points, in a case where the server CPU 15 rejects the priority request from the vehicle 2. The control target point and the curvature target point may be set for the remote control value generator 6 to generate a steering remote control value.

FIG. 17 illustrates three cases.

Case 1 may be a setting example in a case where the current cycle is equal to or less than the standard traveling control target time. In case 1, the vehicle 2 may be traveling on the straight road 100 along the lane.

In this case, the server CPU 15 of the remote control apparatus 4 may set a steering control target point on the road 100 at a distance to be traveled in the standard traveling control target time from the current position of the vehicle 2. The steering control target point may be a position away from the current position of the vehicle 2 by a distance obtained by multiplying the standard traveling control target time by the vehicle speed. The steering control target point may be set at the middle of the lane on which the vehicle 2 is traveling on the straight road 100, by using the high-precision map data, for example.

On the basis of such setting, the remote control value generator 6 may generate the steering amount remote control value for the vehicle 2. The remote control value generator 6 may generate a small steering amount remote control value for traveling from the current position of the vehicle 2 toward the control target point. This remote control value may be used only for suppression of a control error.

The vehicle 2 may receive such a steering remote control value. This enables the vehicle 2 to control its traveling to travel, on the straight road 100, along the middle of the lane on which the vehicle 2 is traveling, on the basis of remote lane keep control in a normal traveling control cycle.

Case 2 may be a setting example in a case where the current cycle is equal to or less than the standard traveling control target time. In case 2, the vehicle 2 may be traveling to enter a corner from a straight part of the road 100.

In this case, the server CPU 15 of the remote control apparatus 4 may set the steering control target point on the road 100 at the distance to be traveled in the standard traveling control target time from the current position of the vehicle 2. The steering control target point may be set at the middle of the lane on which the vehicle 2 is traveling, near an entrance of the corner on the road 100, by using the high-precision map data, for example. The steering control target point in this case may be a position away from the current position of the vehicle 2, along the middle of the curved lane, by the distance obtained by multiplying the standard traveling control target time by the vehicle speed.

In addition, the server CPU 15 may set the curvature target point at the middle of the lane between the current position of the vehicle 2 and the steering control target point. The curvature target point may serve as, for example, an intermediate target point to be used to allow the vehicle 2 to travel with a steering amount based on a remote control value at the steering control target point. The vehicle 2 is able to travel with the steering amount based on the remote control value at the control target point by, for example, starting to travel with the steering amount based on the remote control value from the curvature target point.

On the basis of such setting, the remote control value generator 6 may generate the steering amount remote control value for the vehicle 2. The remote control value generator 6 may generate a relatively large steering amount remote control value for traveling from the current position of the vehicle 2 toward the control target point through the curvature target point.

The vehicle 2 may receive such a steering remote control value. This enables the vehicle 2 to control its traveling to travel along the middle of the lane of the road 100 in entering the corner from the straight part of the road 100, on the basis of the remote lane keep control in the normal traveling control cycle.

Case 3 may be a setting example in a case where the current cycle is longer than the standard traveling control target time. The vehicle 2 may be traveling to enter a corner from a straight part of the road 100, as in case 2.

The server 5 of the remote control apparatus 4 may be executing the remote control for the vehicle 2, on the basis of the priority lower than the priority requested by the vehicle 2. In this case, the traveling control ECU 24 of the vehicle 2 may decelerate the vehicle 2 during the remote control on the basis of the own vehicle control value in step ST82 of FIG. 16, and extend the traveling control cycle of the own vehicle in step ST83.

In this case, on the basis of the rejection of the priority requested by the vehicle 2, the server CPU 15 may set the steering control target point at a position farther than in case 2. The server CPU 15 may set the steering control target point at, for example, a position away from the current position of the vehicle 2 by a distance obtained by multiplying, by the vehicle speed, the time of the traveling control cycle extended by the vehicle 2. As the vehicle speed, the vehicle speed before the deceleration may be used. This allows the steering control target point to be set at a position away from the current position of the vehicle 2 by a distance to be traveled in the extended traveling control target time, and results in a large control error.

Similarly, the server CPU 15 may set the curvature target point at a position farther than in case 2, between the current position of the vehicle 2 and the steering control target point.

On the basis of such setting, the remote control value generator 6 may generate the steering amount remote control value for the vehicle 2. The remote control value generator 6 may generate a relatively large steering amount remote control value for traveling from the current position of the vehicle 2 toward the far control target point through the far curvature target point.

The vehicle 2 may receive such a steering remote control value. This enables the vehicle 2 to control its traveling to travel along the middle of the lane of the road 100 in entering the corner from the straight part of the road 100, on the basis of the remote lane keep control in the traveling control cycle extended from the normal traveling control cycle.

The server CPU 15 may set, for the remote control value generator 6, information such as the speed to be used for the control or the road shape based on the high-precision map data, in addition to the steering control target point and the curvature target point described above. The speed to be used for the control may be the current vehicle speed or the limiting vehicle speed.

As described above, in the example embodiment, in a case where the priority requested of the remote control apparatus 4 is rejected by the remote control apparatus 4, the vehicle 2 may execute the control of extending the traveling control cycle, together with the autonomous deceleration control. In a case where the server 5 rejects the priority request from the vehicle 2, the server 5 may set, for example, the control target point to favorably adapt to the traveling control cycle extended by the vehicle 2. In the remote control system 1, the vehicle 2 and the remote control apparatus 4 are able to continue favorable remote control by repeating the control in the time of the traveling control cycle extended by the vehicle 2.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in an example embodiment described above, the priority and the generation switching may be finally determined by the server 5 of the remote control apparatus 4.

In another example, the priority and the generation switching may be finally determined by each vehicle 2.

In an example embodiment described above, the remote control apparatus 4 may include one server 5 and one remote control value generator 6.

In another example, the server 5 or the remote control value generator 6 of the remote control apparatus 4 may include a plurality of devices by, for example, being divided in predetermined units. The predetermined unit may be, for example, a region or the number of vehicles. The server 5 or the remote control value generator 6 may be divided into a plurality of devices by function or processing load. The plurality of servers 5 or the plurality of remote control value generators 6 may be distributed by, for example, being incorporated in the base stations 9 of the fifth-generation communication network 8.

Each of the remote control value generator 6, the server CPU 15, the driving ECU 21, the steering ECU 22, the braking ECU 23, and the traveling control ECU 24 illustrated in FIGS. 1 to 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the remote control value generator 6, the server CPU 15, the driving ECU 21, the steering ECU 22, the braking ECU 23, and the traveling control ECU 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the remote control value generator 6, the server CPU 15, the driving ECU 21, the steering ECU 22, the braking ECU 23, and the traveling control ECU 24 illustrated in FIGS. 1 to 3.

The invention claimed is:

1. A vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles, the vehicle traveling remote control system comprising:
   the remote control apparatus including a remote control value generating unit configured to repeatedly generate the remote control value for traveling control of each of the vehicles; and
   a traveling control unit to be provided in each of the vehicles, the traveling control unit being configured to execute the traveling control on a basis of the remote control value repeatedly received by the each of the vehicles from the remote control apparatus, wherein
   the remote control apparatus is configured to generate, using the remote control value generating unit, the remote control value in accordance with a priority or a target response cycle that are changed depending on a traveling environment of each of the vehicles.

2. The vehicle traveling remote control system according to claim 1, wherein
   information including at least detection information of a vehicle sensor of each of the vehicles and a position and a time of the each of the vehicles is transmitted from each of the vehicles to the remote control apparatus, the detection information of the vehicle sensor including a captured image of a vehicle outside sensor mounted on the each of the vehicles, and
   the remote control value generating unit of the remote control apparatus is configured to generate, by using the information received from each of the vehicles, the remote control value for the traveling control in each of the vehicles.

3. The vehicle traveling remote control system according to claim 2, wherein the remote control apparatus is configured to
   predict the traveling environment of each of the vehicles on a basis of the information received from the each of the vehicles, and
   determine the priority or the target response cycle of the each of the vehicles, depending on the predicted traveling environment of the each of the vehicles.

4. The vehicle traveling remote control system according to claim 1, wherein the remote control apparatus is configured to,
   on a condition that the traveling environment of one of the vehicles is predicted to become a traveling environment where the remote control value is likely to change,
   update the priority or the target response cycle to allow the one of the vehicles to be subjected to processing preferentially over another one of the vehicles.

5. The vehicle traveling remote control system according to claim 2, wherein the remote control apparatus is configured to,
   on a condition that the traveling environment of one of the vehicles is predicted to become a traveling environment where the remote control value is likely to change,
   update the priority or the target response cycle to allow the one of the vehicles to be subjected to processing preferentially over another one of the vehicles.

6. The vehicle traveling remote control system according to claim 3, wherein the remote control apparatus is configured to,
   on a condition that the traveling environment of one of the vehicles is predicted to become a traveling environment where the remote control value is likely to change,
   update the priority or the target response cycle to allow the one of the vehicles to be subjected to processing preferentially over another one of the vehicles.

7. The vehicle traveling remote control system according to claim 1, wherein the remote control apparatus is configured to, update the priority or the target response cycle to allow one of the vehicles to be subjected to processing preferentially over another one of the vehicles on a condition that the traveling environment of the one of the vehicles is predicted to be one or more of a case where a preceding vehicle decelerates, a case where a traffic light is present in a traveling direction of the one of the vehicles, a case where the one of the vehicle travels toward an entrance or an exit of a curve, a case where the one of the vehicle travels in a merging section, a case where the one of the vehicle travels toward an intersection, and a case where crosswind blows.

8. The vehicle traveling remote control system according to claim 2, wherein the remote control apparatus is configured to, update the priority or the target response cycle to allow one of the vehicles to be subjected to processing preferentially over another one of the vehicles on a condition that the traveling environment of the one of the vehicles is predicted to be one or more of a case where a preceding vehicle decelerates, a case where a traffic light is present in a traveling direction of the one of the vehicles, a case where the one of the vehicle travels toward an entrance or an exit of a curve, a case where the one of the vehicle travels in a merging section, a case where the one of the vehicle travels toward an intersection, and a case where crosswind blows.

9. The vehicle traveling remote control system according to claim 1, wherein the traveling control unit is configured to
transmit, to the remote control apparatus, a request for processing with the priority determined by each of the vehicles, and,
on a condition that the requested priority is not obtained in the remote control apparatus, execute deceleration control or extend a cycle of the traveling control in the each of the vehicles, to adapt to the priority in the remote control apparatus.

10. The vehicle traveling remote control system according to claim 2, wherein the traveling control unit is configured to
transmit, to the remote control apparatus, a request for processing with the priority determined by each of the vehicles, and,
on a condition that the requested priority is not obtained in the remote control apparatus, execute deceleration control or extend a cycle of the traveling control in the each of the vehicles, to adapt to the priority in the remote control apparatus.

11. The vehicle traveling remote control system according to claim 1, wherein
each of the vehicles is to be further provided with
a vehicle control value generating unit configured to generate a vehicle control value to be used for the traveling control of the each of the vehicles, on a basis of an operation performed by an occupant of the each of the vehicles or automatic driving, and
a traveling processor configured to execute the traveling control based on a control value by receiving, as the control value, the vehicle control value generated by the vehicle control value generating unit, and
the remote control value generating unit of the remote control apparatus is configured to generate the remote control value to be received by the traveling processor in each of the vehicles as with the vehicle control value generated by the vehicle control value generating unit of each of the vehicles.

12. The vehicle traveling remote control system according to claim 2, wherein
each of the vehicles is to be further provided with
a vehicle control value generating unit configured to generate a vehicle control value to be used for the traveling control of the each of the vehicles, on a basis of an operation performed by an occupant of the each of the vehicles or automatic driving, and
a traveling processor configured to execute the traveling control based on a control value by receiving, as the control value, the vehicle control value generated by the vehicle control value generating unit, and
the remote control value generating unit of the remote control apparatus is configured to generate the remote control value to be received by the traveling processor in each of the vehicles as with the vehicle control value generated by the vehicle control value generating unit of each of the vehicles.

13. The vehicle traveling remote control system according to claim 11, wherein
the remote control apparatus is configured to
determine whether each of the vehicles is unable to travel due to a malfunction occurs in the vehicle control value generating unit or a trouble involving the occupant, or
determine whether an area in which each of the vehicles is traveling is a specific area set to prioritize remote traveling control over autonomous traveling control,
the remote control value generating unit is configured to generate the remote control value to be used for the traveling control of one of the vehicles which has been determined to be unable to travel, or determined as traveling in the specific area, and
the traveling control unit is configured to,
on a condition that the remote control value is received from the remote control apparatus,
use, for the traveling control of the vehicle, the remote control value received from the remote control apparatus preferentially over the vehicle control value generated by the vehicle control value generating unit of the each of the vehicles.

14. The vehicle traveling remote control system according to claim 12, wherein
the remote control apparatus is configured to
determine whether each of the vehicles is unable to travel due to a malfunction occurs in the vehicle control value generating unit or a trouble involving the occupant, or
determine whether an area in which each of the vehicles is traveling is a specific area set to prioritize remote traveling control over autonomous traveling control,
the remote control value generating unit is configured to generate the remote control value to be used for the traveling control of one of the vehicles which has been determined to be unable to travel, or determined as traveling in the specific area, and
the traveling control unit is configured to,
on a condition that the remote control value is received from the remote control apparatus,
use, for the traveling control of the vehicle, the remote control value received from the remote control apparatus preferentially over the vehicle control value generated by the vehicle control value generating unit of the each of the vehicles.

15. The vehicle traveling remote control system according to claim 11, wherein
the remote control apparatus further includes
a traveling control information generating unit configured to generate traveling control information available for the vehicle control value generating unit of each of the vehicles to generate the vehicle control value, and
a switching control unit configured to switch a generation process for each of the vehicles between a generation process by the traveling control information generating unit and a generation process by the remote control value generating unit, and
the switching control unit is configured to, in a case where one of the vehicles is determined to be unable to travel, switch the generation process for the one of the vehicles from the generation process by the traveling control information generating unit to the generation process by the remote control value generating unit.

16. The vehicle traveling remote control system according to claim 13, wherein
the remote control apparatus further includes
a traveling control information generating unit configured to generate traveling control information available for the vehicle control value generating unit of each of the vehicles to generate the vehicle control value, and
a switching control unit configured to switch a generation process for each of the vehicles between a generation process by the traveling control information generating unit and a generation process by the remote control value generating unit, and
the switching control unit is configured to, in a case where one of the vehicles is determined to be unable to travel, switch the generation process for the one of the vehicles from the generation process by the traveling control information generating unit to the generation process by the remote control value generating unit.

17. A vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles, the vehicle traveling remote control system comprising:
the remote control apparatus configured to repeatedly generate the remote control value for traveling control of each of the vehicles; and
circuitry to be provided in each of the vehicles, the circuitry being configured to execute the traveling control on a basis of the remote control value repeatedly received by the each of the vehicles from the remote control apparatus, wherein
the remote control apparatus is configured to generate the remote control value in accordance with a priority or a target response cycle that are changed depending on a traveling environment of each of the vehicles.

* * * * *